(12) United States Patent
Imamura et al.

(10) Patent No.: US 8,797,305 B2
(45) Date of Patent: Aug. 5, 2014

(54) DISPLAY DEVICE AND METHOD FOR DRIVING SAME

(75) Inventors: Kentarou Imamura, Osaka (JP); Shigeto Yoshida, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 341 days.

(21) Appl. No.: 13/138,244

(22) PCT Filed: May 14, 2010

(86) PCT No.: PCT/JP2010/058223
§ 371 (c)(1),
(2), (4) Date: Jul. 22, 2011

(87) PCT Pub. No.: WO2010/137474
PCT Pub. Date: Dec. 2, 2010

(65) Prior Publication Data
US 2011/0279426 A1 Nov. 17, 2011

(30) Foreign Application Priority Data

May 29, 2009 (JP) .................................. 2009-131554

(51) Int. Cl.
*G09G 5/00* (2006.01)
*G09G 3/30* (2006.01)
*H04N 13/04* (2006.01)

(52) U.S. Cl.
CPC ...................................... *G09G 3/30* (2013.01); *H04N 13/0438* (2013.01)
USPC ............................ 345/207; 345/204; 345/690

(58) Field of Classification Search
CPC ............ G09G 3/30; G09G 2310/0235; G09G 2360/16; G09G 5/006; G06G 2/20; G06G 3/0416; G06G 3/0421; H04N 13/0438; G06F 3/0416; G06F 3/0421
USPC ........................ 345/207, 690, 204; 178/18.01
See application file for complete search history.

(56) References Cited

U.S. PATENT DOCUMENTS 6,115,092 A 9/2000 Greene et al.
6,483,482 B1 11/2002 Kim
(Continued)

FOREIGN PATENT DOCUMENTS

JP 07-128652 5/1995
JP 2000-056713 2/2000
(Continued)

OTHER PUBLICATIONS

International Search Report dated Aug. 17, 2010 for PCT/JJP2010/058223.

(Continued)

*Primary Examiner* — Thuy Pardo
(74) *Attorney, Agent, or Firm* — Harness, Dickey & Pierce, P.L.C.

(57) ABSTRACT

Provided is a display device for carrying out seamless display so that a sense of strangeness is not given to a viewer or the sense of strangeness is reduced. In at least one embodiment, a display device includes a display panel on which a plurality of display elements are disposed in a matrix, the display panel having a frame area which is located at an end of the display panel and in which no display element is provided; a light guide element provided on the display panel, the light guide element changing a light path of part of light emitted from the plurality of display elements so that the part of light is guided to the frame area; a photosensor provided on the display panel, the photosensor detecting environment illuminance; an image signal correcting section which (i) corrects, in accordance with the environment illuminance detected by the photosensor, an image signal to be supplied to a display element included in an area where the light guide element is provided so that a reduction in luminance or coloring of display light of the image caused by the light guide element is reduced, and (ii) outputs a corrected image signal; and a driving section which drives the display element in accordance with the corrected image signal.

15 Claims, 14 Drawing Sheets

(56) References Cited

U.S. PATENT DOCUMENTS

| | | | |
|---|---|---|---|
| 6,570,103 B1* | 5/2003 | Saka et al. | 178/18.01 |
| 8,416,501 B2* | 4/2013 | Nakanishi | 359/633 |
| 2005/0146520 A1* | 7/2005 | Ikeda | 345/204 |
| 2005/0285811 A1 | 12/2005 | Kawase et al. | |
| 2006/0044289 A1* | 3/2006 | Yee | 345/204 |
| 2006/0077544 A1 | 4/2006 | Stark | |
| 2006/0082568 A1* | 4/2006 | Yamazaki et al. | 345/207 |
| 2006/0170883 A1* | 8/2006 | Matsui | 353/85 |
| 2008/0284763 A1* | 11/2008 | Someya et al. | 345/204 |
| 2009/0041341 A1 | 2/2009 | Scheibe | |
| 2010/0165012 A1* | 7/2010 | Koyama | 345/690 |
| 2011/0134150 A1 | 6/2011 | Imamura | |

FOREIGN PATENT DOCUMENTS

| | | |
|---|---|---|
| JP | 2000-180964 | 6/2000 |
| JP | 2001-005414 | 1/2001 |
| JP | 2004-029629 A | 1/2004 |
| WO | WO 2007/063274 | 6/2007 |
| WO | WO 2008/149449 | 12/2008 |
| WO | WO 2009/020993 | 2/2009 |
| WO | WO 2010-047344 | 4/2010 |

OTHER PUBLICATIONS

European Search Report dated Oct. 22, 2012.

* cited by examiner

F I G. 2
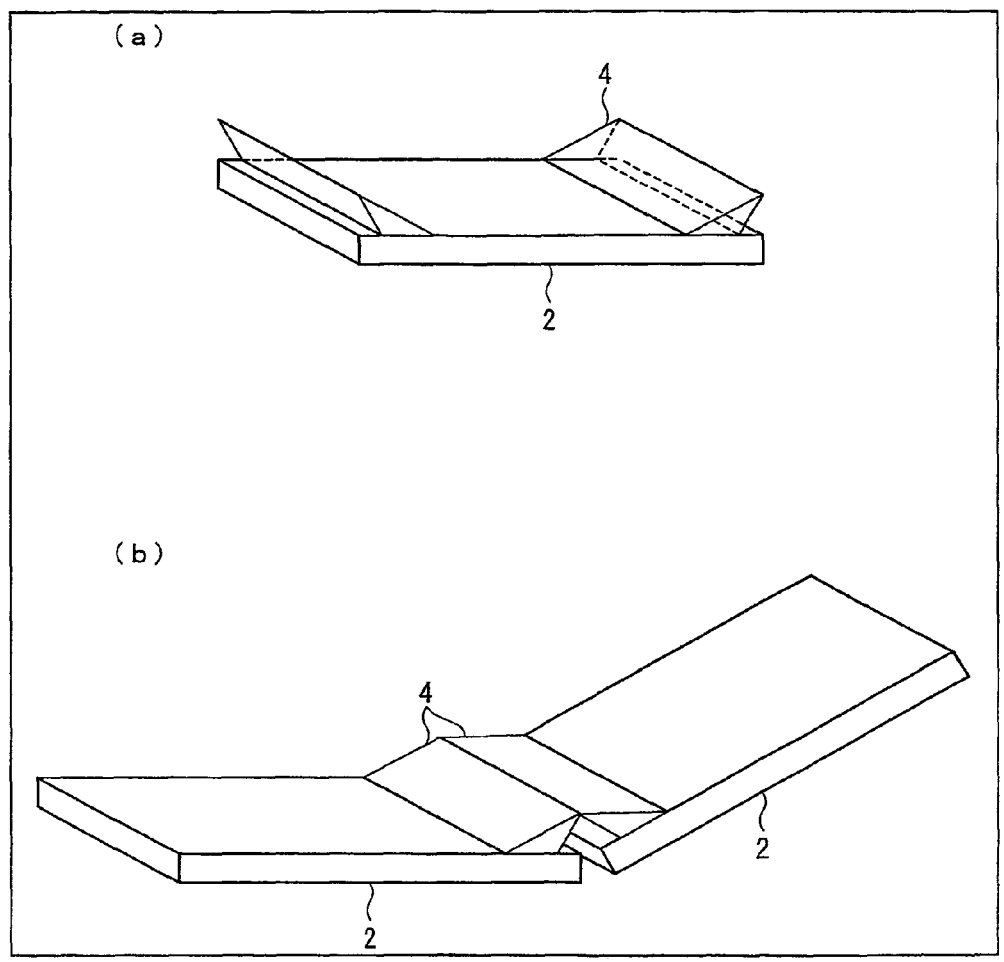

F I G. 5
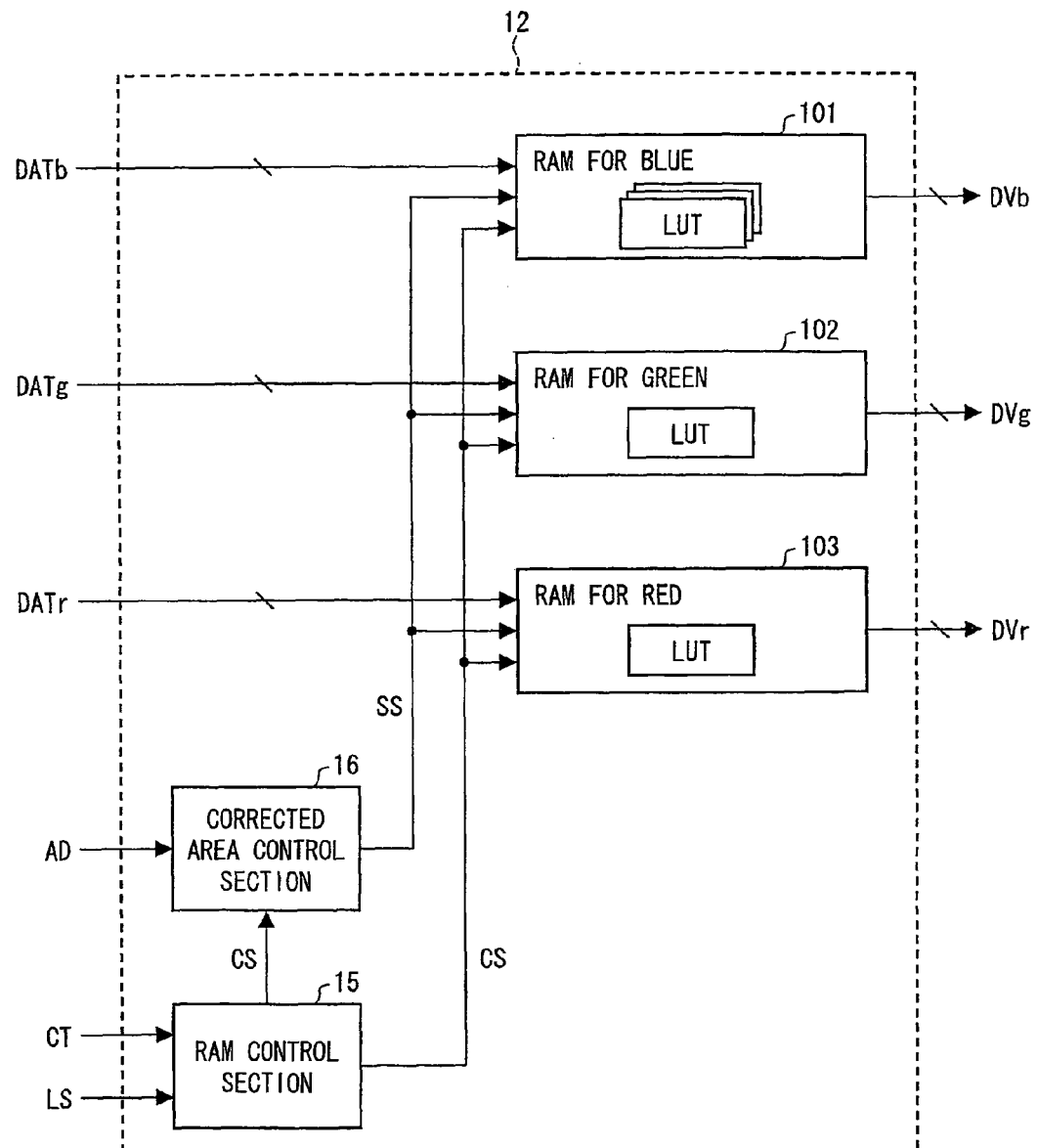

F I G. 1 0
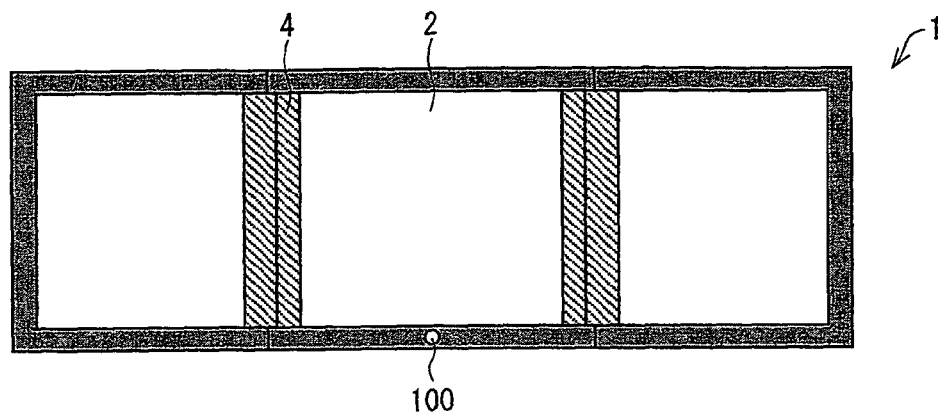

DISPLAY DEVICE AND METHOD FOR DRIVING SAME

TECHNICAL FIELD

The present invention relates to a display device and a method for driving the display device. More specifically, the present invention relates to (i) a display device (hereinafter referred to as seamless display) in which a seamless screen is achieved with the use of a plurality of display panels and (ii) a method for driving the display device.

BACKGROUND ART

In recent years, there is an increasing demand for a light and thin display. Especially, active matrix type liquid crystal display devices using a large liquid crystal panel are in wide spread use. However, an increase in size of a liquid crystal panel poses many technical restrictions. In view of this, attempts have been conventionally made for seemingly increasing a size of a liquid crystal panel by combining a plurality of display devices.

However, since each of the display devices has a frame region, the attempts cause a problem that seams between the plurality of display devices are visible. This problem is not a problem specific to liquid crystal display devices, but is a problem common to direct-view-type display devices such as a PDP and an organic EL display device.

Patent Literature 1 for example discloses an arrangement in which light emitted from a display area is guided to a non-display area by a fiber optic faceplate covering an entire surface of a display panel so that a seamless image is displayed.

Patent Literature 2 discloses an arrangement in which a fiber optic faceplate complex is provided on an entire surface of a display panel on which display units are provided in a tile-like manner, and in each of the display units, light emitted from a display area is guided, by an individual fiber optic faceplate, to a non-display area formed around the display area so as to be expanded. Thus, a seamless image is displayed.

Patent Literature 3 discloses an arrangement in which light compensation means including (i) a large number of tilted thin films tilted at a predetermined angle and (ii) a transparent member that fills in between the tilted thin films is provided on an almost entire surface of a display panel, and light emitted from a display area is guided to a non-display area by the light compensation means so that a seamless image is displayed.

CITATION LIST

Patent Literature 1

Japanese Patent Application Publication, Tokukaihei, No. 7-128652 A (Publication Date: May 19, 1995)

Patent Literature 2

Japanese Patent Application Publication, Tokukai, No. 2000-56713 A (Publication Date: Feb. 25, 2000)

Patent Literature 3

Japanese Patent Application Publication, Tokukai, No. 2001-5414 A (Publication Date: Jan. 12, 2001)

SUMMARY OF INVENTION

Technical Problem

However, the techniques disclosed in Patent Literatures 1 through 3 require a fiber optic faceplate covering an almost entire surface of a display panel or light compensation means including a large number of tilted thin films and a transparent member that fills in between the tilted thin films. Accordingly, from the perspective of manufacturing method and cost, the techniques disclosed in Patent Literatures 1 through 3 are not practical especially for large-size display devices.

Further, the conventional techniques are effective only under certain conditions such as a dark room environment, and are not effective under external environment. Specifically, in a case where a fiber faceplate or the like is used as a light path changing member, a chromaticity shift occurs in accordance with illuminance of external light especially in displaying an image of low display luminance even if correction for seamless display in a dark room has been performed. This problem is not considered at all in the conventional techniques.

Accordingly, in the conventional techniques, a light path changing member such as a fiber faceplate is not transparent nor colorless from the beginning, and absorbs light of specific wavelengths, as shown in FIG. 16a. As a result, out of incident external light, light that has not been absorbed is added to display light emitted from a display device. This causes a chromaticity shift.

FIG. 16b shows a part of an x-y chromaticity diagram and shows that chromaticity of black display in a seamless display is shifted in accordance with illuminance of external light.

More specifically, the vicinity of the coordinate (x, y)=(0.31, 0.32) corresponds to black (all of gradations of R, G, and B is 0), and the chromaticity is shifted towards the vicinity of the coordinate (x, y)=(0.37, 0.38) as illuminance of external light increases. This shift indicates that black becomes yellowish.

This shift in chromaticity that makes a color yellowish is noticeable especially in black display. This is because an influence of external light becomes larger in black display since an amount of light reflected by a surface of a display panel in a case where external light passes through a light guide element is relatively large as compared to an amount of light emitted from the display panel during black display. Note that black may become yellow-green close to yellow or orange close to yellow or may be shifted to a color other than the above colors depending on the type of the fiber plate. The color shift caused by illuminance of external light is not constant relative to the illuminance, and tends to be saturated.

The present invention was attained in view of the above problems, and an object of the present invention is to provide (i) a display device for carrying out seamless display so that a sense of strangeness is not given to a viewer or the sense of strangeness is reduced and (ii) a method for driving the display device.

Solution to Problem

In order to attained the above object, a display device of the present invention that displays an image based on image signals, includes: at least one display panel on which a plurality of display elements for displaying the image are disposed in a matrix, the at least one display panel having a frame area which is located at an end of the at least one display panel and in which no display element is provided; a light guide element provided on the at least one display panel, the light guide element changing a light path of part of light emitted from the plurality of display elements so that the part of light is guided to the frame area; at least one photosensor provided on the at least one display panel, the at least one photosensor detecting environment illuminance; an image signal correcting section which (i) corrects, in accordance with the environment illuminance detected by the at least one photosensor, an image signal to be supplied to a display element included in an area where the light guide element is provided out of the image signals, and (ii) outputs a result obtained by the correction as a corrected image signal; and a driving section which drives the display element in accordance with the corrected image signal.

In order to attain the above object, a driving method of the present invention for driving a display device including a display panel on which a plurality of display elements for displaying an image based on image signals are disposed in a matrix, the display panel having a frame area which is located at an end of the display panel and in which no display element is provided; a light guide element which is provided on the display panel and which changes a light path of light emitted from the plurality of display elements so that the light is guided to the frame area, includes the steps of: detecting an environment illuminance of the display device; correcting, in accordance with the environment illuminance thus detected, an image signal to be supplied to a display element included in an area where the light guide element is provided out of the image signals; and driving the display element in accordance with a corrected image signal obtained by the correction.

According to the arrangement, the light guide element provided on the display panel changes a light path of part of light emitted from the display elements disposed in a matrix so that the part of light is guided to the frame area. This makes it possible to provide a display device that is capable of displaying an image also in the frame area where no display element is provided.

However, there arises a problem that chromaticity of display light observed by a viewer is shifted by the light guide element in the area where the light guide element is provided depending on the environment illuminance. For example, under a dark room environment, light emitted from a display element is absorbed by the light guide element when passing through the light guide element. Accordingly, a reduction in luminance occurs, and a chromaticity shift (hereinafter referred to as a color shift) occurs since the light guide element absorbs a light component of a specific wavelength band relatively well. Further, under a bright room environment, a color shift caused by external light occurs in addition to the reduction in luminance and color shift of light emitted from the display element. The color shift caused by external light is a color shift which occurs since the light guide element absorbs a light component of a specific wavelength band of external light when the display panel is irradiated with a external light, that is, while the external light passes through the light guide element, is reflected by the display panel, and returns through the light guide element.

Note that the reduction in luminance which occurs in a case where light emitted from the display element passes through the light guide element does not depend on a light amount of external light, whereas the color shift caused by external light is more noticeable as a proportion of a light amount of external light to a light amount of the light emitted from the display element becomes larger, and if the external light and the light emitted from the display element are equal in proportion, the color shift caused by external light is more noticeable as the light amount of external light becomes larger.

In view of this, the present invention corrects an image signal to be supplied to a display element in the area where the light guide element is provided, in accordance with detected environment illuminance. That is, the image signal is corrected in accordance with environment illuminance so that at least one of a reduction in luminance and a color shift that occur, due to the light guide element, in display light of the display device observed by a viewer is reduced. Accordingly, it is possible to suppress occurrence of a difference in luminance between display in a light guide element portion and display in a normal display area where the light guide element is not provided or a color shift. Consequently, it is possible to carry out display also in the frame area while suppressing not only a difference in luminance but also a difference in chromaticity between the display area where the display elements are disposed and the frame area where no display element is disposed. This produces an effect that it is possible to provide a display device that can be adapted to a change in external environment.

Advantageous Effects of Invention

As described above, according to the display device of the present invention and the driving method of the display device, an image signal to be supplied to a display element included in the area where the light guide element is provided is corrected in accordance with detected environment illuminance.

Accordingly, it is possible to suppress occurrence of at least one of a reduction in luminance of display of a light guide element portion and a color shift. This produces an effect that it is possible to carry out display also in the frame area while suppressing at least one of a difference in luminance and a difference in chromaticity between the display area where the display elements are disposed and the frame area where no display element is disposed.

BRIEF DESCRIPTION OF DRAWINGS

FIG. 1 is a block diagram illustrating an overall arrangement of an active matrix type liquid crystal display device of Embodiment 1 of the present invention.

FIG. 2

FIG. 2 is a perspective view schematically illustrating appearance of the liquid crystal display device. (a) of FIG. 2 shows a case where the liquid crystal display device includes a single liquid crystal display panel, and (b) of FIG. 2 shows a case where the liquid crystal display device includes two liquid crystal display panels.

FIG. 3 is a partial cross-sectional view illustrating structures of the liquid crystal display panel and a light guide element.

FIG. 4 is a block diagram illustrating an arrangement of a display control circuit shown in FIG. 1.

FIG. 5

FIG. 5 is a block diagram illustrating an arrangement of a data correcting section shown in FIG. 4.

FIG. 6 is a diagram schematically illustrating an internal arrangement of RAM for green and RAM for red shown in FIG. 5. (a) of FIG. 6 shows one exemplary arrangement, (b) of FIG. 6 shows another exemplary arrangement, and (c) of FIG. 6 shows still another exemplary arrangement.

FIG. 7 is a diagram schematically illustrating an internal arrangement of a RAM for blue shown in FIG. 5.

FIG. 8 is a graph showing a gamma characteristic of a corrected image signal for blue to be supplied to a display area end portion A2 of Embodiment 1 of the present invention.

FIG. 9 is a flow chart showing an example of a method for selecting an image signal correction pattern in accordance with environment illuminance of Embodiment 1 of the present invention.

FIG. 10

FIG. 10 is a plan view schematically illustrating an example of a display device of Embodiment 2 of the present invention.

FIG. 11a

FIG. 11a is a plan view schematically illustrating another display device of Embodiment 2 of the present invention.

FIG. 11b is a cross-sectional view of the display device shown in FIG. 11a.

FIG. 11c is a cross-sectional view showing a fiber plate provided in the display device shown in FIG. 11a.

FIG. 12a

FIG. 12a is a cross-sectional view of an optical fiber constituting the fiber plate.

FIG. 12b is a cross-sectional view schematically illustrating an example of how photosensors are provided in the display device.

FIG. 13a

FIG. 13a is a plan view schematically illustrating another example of how photosensors are provided in the display device.

FIG. 13b is a cross-sectional view taken along the line X-X of FIG. 13a.

FIG. 14 is a graph showing a gamma correction curve for achieving matching in luminance between a normal display area and a display area end portion in a dark room environment.

FIG. 15 is a graph showing a gamma correction curve for achieving matching in luminance and tinge between a normal display area and a display area end portion in a dark room environment.

FIG. 16a

FIG. 16a is a diagram explaining why coloring occurs due to a light path changing member.

FIG. 16b is a chromaticity diagram showing a chromaticity shift.

DESCRIPTION OF EMBODIMENTS

[Embodiment 1]

Figure 1:
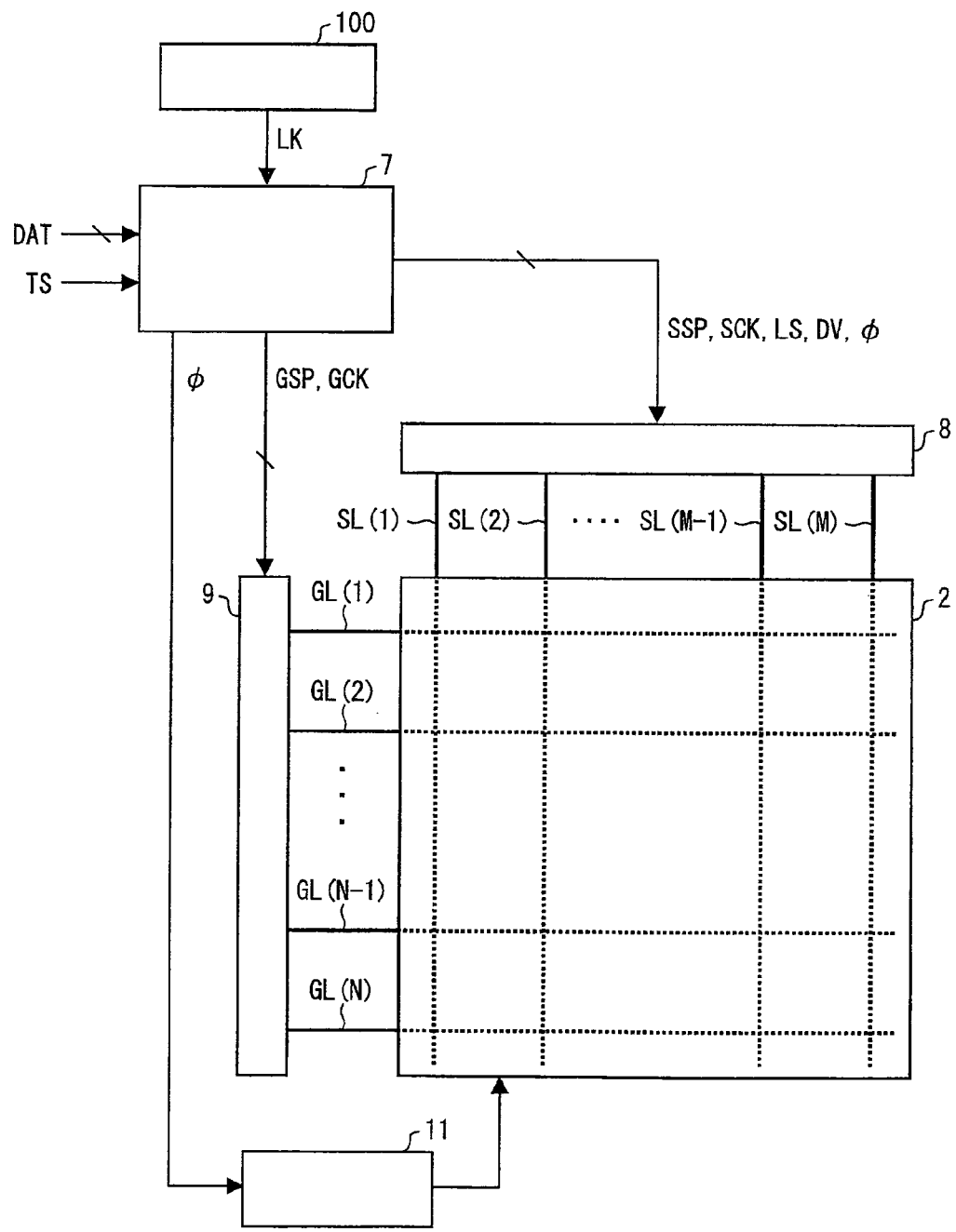
FIG. 1

An embodiment of the present invention is described below with reference to FIGS. 1 through 9. Note that dimensions, materials, shapes, relative positions etc. of the constituent members described in the present embodiment are cited merely by way of example and without limitation, unless otherwise specified.

FIG. 2 is a perspective view schematically illustrating an appearance of a display device of the present embodiment. Embodiment 1 deals with a case where the display device is a liquid crystal display device, but is not limited to this. Each of the liquid crystal display devices shown in (a) and (b) of FIG. 2 includes a liquid crystal display panel(s) 2 and light guide elements 4. The liquid crystal display device shown in (a) of FIG. 2 includes a liquid crystal display panel 2 having a rectangular shape and two light guide elements 4 provided on the liquid crystal display panel 2 so as to be located in right and left peripheral areas facing each other out of peripheral areas of the liquid crystal display panel 2. Meanwhile, the liquid crystal display device shown in (b) of FIG. 2 includes two liquid crystal display device 2 provided so that their ends are in proximity with each other, and light guide elements 4 provided on the respective liquid crystal display devices 2 so as to be in contact with each other with no gap therebetween.

The liquid crystal display panels 2 are connected to each other by a movable mechanism (e.g., hinge or the like) (not shown) so that a relative angle between display surfaces of the liquid crystal display panels 2 can be changed. Note that such a movable mechanism is an example, and can be omitted. For example, it is also possible that the two liquid crystal display panels are fixed so that their ends are in contact with each other. Moreover, the number of liquid crystal display panels is not limited to two, and three or more liquid crystal display panels may be connected to each other.

Each of the liquid crystal display panels 2 has (i) a display area in which a plurality of display elements (not shown) for displaying an image are disposed in a matrix and (ii) an area (hereinafter referred to as "frame area") around the display area. No display element is disposed in the frame area, and therefore an image cannot be displayed in the frame area.

Each of the light guide elements 4 is, for example, a fiber (face)plate, and has a function of changing a light path of part of light emitted from the display elements so that the part of light is guided to the frame area, i.e., a function of changing the display area (display surface) of the liquid crystal display panel 2.

The fiber plate has a shape of a bundle of fibers each having a diameter of several μm. Each of the fibers is constituted by core glass for transferring light, clad glass that covers the core glass and that has a refractive index different from that of the core glass, and an absorber that absorbs light leaked from the core glass. Since each of the fibers can transfer light without interfering with the other fibers, an image given to a light incident surface of the fiber plate (which is a light incident surface common to all the fibers) is obtained from a light exit surface as it is.

Accordingly, in the arrangement of (a) of FIG. 2, a light path of part of an image displayed on the liquid crystal display panel 2 is changed by the light guide elements 4 each of which is such a fiber plate, so that an image can be displayed also in the frame area. Further, in the arrangement of (b) of FIG. 2, a light path is changed in a similar manner by the light guide elements 4, so that an image without seams or joins (seamless image) can be displayed. This is described below in detail.

Generally, a liquid crystal display panel has, on its periphery, a frame area in which display cannot be carried out. The frame area is provided as a clearance necessary at a manufacturing stage. Specifically, a substrate constituting a liquid crystal panel is produced by cutting a single original substrate into a plurality of substrates. Accordingly, the frame area is necessary as a clearance at which substrates are cut away from each other.

Further, the frame area is used as an area to which a sealing agent for sealing liquid crystal is applied and as an area where signal wiring, preliminary wiring, test wiring, connection wiring or a connection terminal connected to an external circuit is provided.

Accordingly, since the liquid crystal display panel 2 has such a frame area, an image cannot be displayed in the frame area, and even in a case where a large-sized display screen is obtained by disposing a plurality of liquid crystal display panels so that their ends are in contact with each other, an image that is seamless on the whole cannot be displayed on the display screen.

Figure 3:
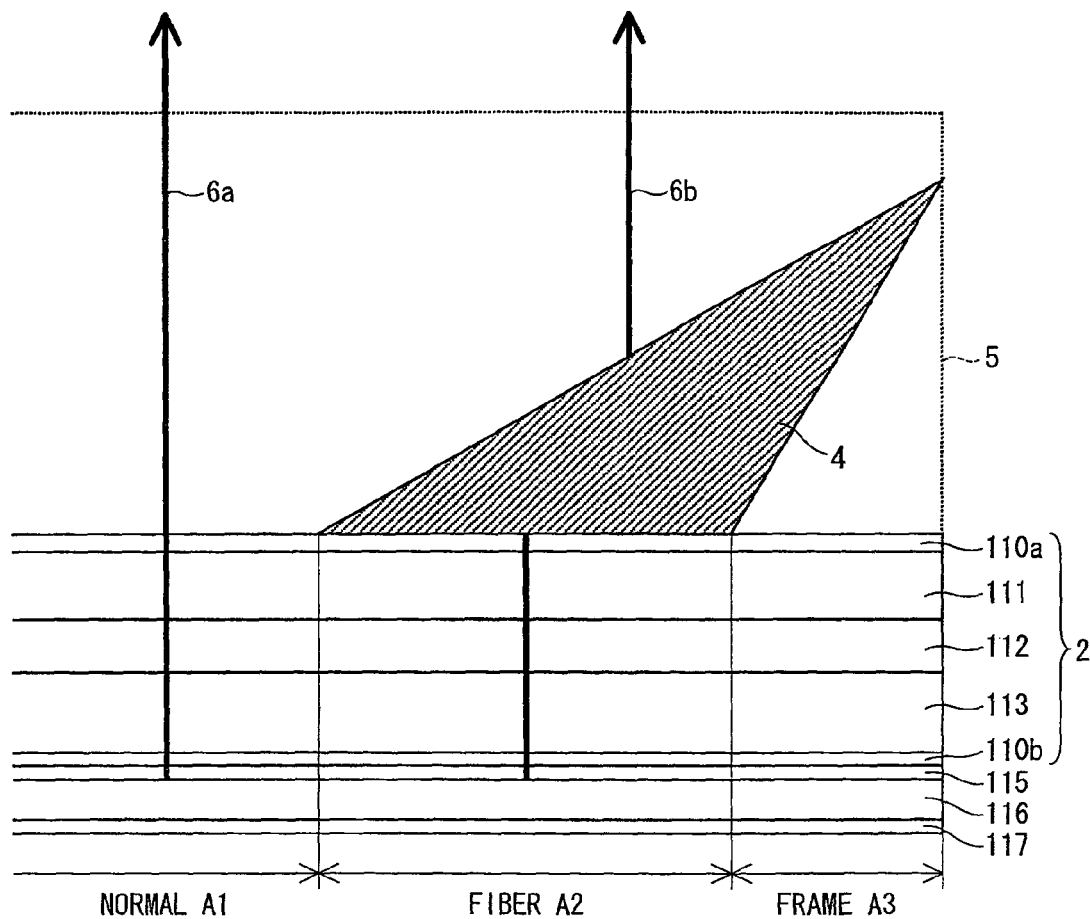
FIG. 3

In view of this, each of the light guide elements 4 is provided on an area A2 (hereinafter referred to as a display area end portion) in the vicinity of an edge of the liquid crystal display panel 2 so as to be located above a frame area A3 outside the display area, as shown in FIG. 3. This allows a light path of light emitted from the display area end portion A2 to be changed so that the light is guided to the frame area A3. Thus, an image of the display area end portion A2 is displayed on the frame area A3. Consequently, a seamless image can be displayed. The following describes structures of such liquid crystal display panel 2 and light guide element 4 with reference to FIG. 3.

FIG. 3 is a partial cross-sectional view illustrating a structure of the liquid crystal display panel 2 and the light guide element 4. In FIG. 3, courses (light paths) 6a and 6b of light emitted from the liquid crystal display panel 2 (practically, emitted from a light guide plate 116 in a later-described backlight device) are exemplified by the thick arrows. A transparent cover 5 that is shown in FIG. 3, but is not shown in FIG. 2 protects the liquid crystal display panel 2 and the light guide element 4.

FIG. 3 is a cross-sectional view of the liquid crystal display panel 2 and the light guide element 4 taken along a longitudinal direction (right-to-left direction of FIG. 2) of the liquid crystal display panel shown in FIG. 2, which cross-sectional view mainly illustrates the vicinity of the light guide element 4 in close-up.

The light guide element 4, which is a fiber plate, has a bottom surface which light from the liquid crystal display panel 2 enters (i.e., light incident surface of all the fibers constituting the fiber plate). The bottom surface of the light guide element 4 is bonded to the display area end portion A2 of the liquid crystal display panel 2. Further, the light guide element 4 has an upper slanted surface from which the light from the liquid crystal display panel 2 exits (i.e., light exit surface of all the fibers). The upper slanted surface of the light guide element 4 covers (leans over) a range from the display area end portion A2 to the frame area A3 of the liquid crystal display panel 2.

Accordingly, a light path of light that is emitted from the display area end portion A2 of the liquid crystal display panel 2 and then enters the light guide element 4 is changed by the light guide element 4 so that the light is emitted also towards an area above the frame area A3. As a result, an image is displayed as if the frame area A3 in which no image can be displayed does not exist.

Various kinds of display are carried out on the liquid crystal display panel 2 by controlling, for each pixel, a transmission amount of light emitted from a light source, such as an LED (Light Emitting Diode) (not shown), which is included in the backlight device. Accordingly, the liquid crystal display panel 2 includes: a TFT (Thin Film Transistor) substrate 111, a CF (Color Filter) substrate 113, and a liquid crystal layer 112 sandwiched by these substrates. On a top surface of the TFT substrate 111, a polarization plate 110a is bonded. On a bottom surface of the CF substrate 113, a polarization plate 110b is bonded.

The backlight device is provided so that its top surface is in contact with a bottom surface of the liquid crystal display panel 2. The light source (not shown) is provided in an end part of the backlight device. The backlight device includes: the light guide plate 116 which causes light from the light source to be emitted from an illumination surface in a form of plane emission; a lens sheet etc. 115 including a lens sheet, a light diffusion sheet, etc. which are disposed on a top surface (illumination surface) of the light guide plate 116; and a reflecting sheet 117 bonded to a bottom surface (a surface opposite to the illumination surface) of the light guide plate 116.

Light emitted from the light source of the backlight device enters a predetermined light incident surface of the light guide plate 116, and then spreads throughout the light guide plate 116. Thus, the light is emitted from the illumination surface (light-emitting surface) of the lens sheet etc. 115 in a form of plane emission. Out of the light thus emitted, light emitted from the display area end portion A2 of the liquid crystal display panel 2 passes through the light guide element 4, and light emitted from the display area (hereinafter referred to as "normal display area") A1 other than the display area end portion A2 is emitted towards an outside the device without passing through the light guide element 4, so that a displayed image is formed.

The following describes an overall arrangement and operation of a liquid crystal display device for forming such a displayed image.

FIG. 1 is a block diagram illustrating an overall arrangement of an active matrix type liquid crystal display device of Embodiment 1 of the present invention. The liquid crystal display device includes: a driving control section constituted by a display control circuit 7 (image signal correcting section), a video signal line driving circuit (source driver) 8, a scanning signal line driving circuit (gate driver) 9, and a common electrode driving circuit 11; the liquid crystal display panel 2, a backlight section constituted by a backlight device 3 and a backlight driving circuit (not shown); and a photosensor 100.

The display control circuit 7 and the video signal line driving circuit 8 are often realized by separate large scale integration circuit (hereinafter referred to as "LSI") chips. In the present embodiment, however, the display control circuit 7 and the video signal line driving circuit 8 are realized by a single LSI chip (source driver with a built-in RAM). Alternatively, a driving control circuit including the display control circuit 7, the video signal line driving circuit 8, and the scanning signal line driving circuit 9 may be realized by a single LSI chip or may be monolithically formed on a glass substrate of the liquid crystal panel.

A display section of the liquid crystal display panel 2 shown in FIG. 1 includes a plurality of (M) video signal lines SL(1) through SL(M), a plurality of (N) scanning signal lines GL(1) through GL(N), and a plurality of (M× N) pixel formation sections (corresponding to the display elements) (not shown) provided corresponding to intersections between the plurality of video signal lines and the plurality of scanning signal lines.

Each of the pixel formation sections is constituted by (i) a TFT (Thin Film Transistor) (not shown) which is a switching element whose gate terminal is connected to a scanning signal line GL(n) passing through a corresponding intersection and whose source terminal is connected to a video signal line SL(m) passing through the corresponding intersection, (ii) a pixel electrode (not shown) connected to a drain terminal of the TFT, (iii) a common electrode (also referred to as "counter electrode") (not shown) shared by the plurality of pixel formation sections, and (iv) a liquid crystal layer serving as an electro-optic device sandwiched between the pixel electrode and the common electrode.

Each of the pixel formation sections includes R (red), G (green), and B (blue) pixel formation sections, and R, G, and B pixels formed by these pixel formation sections are combined to form a single color pixel. The colors are not limited to the three colors: R, G, and B, and any colors selected from six colors of R (red), G (green), B (bleu), Y (yellow), C (cyan), and M (magenta)) may be used. A driving mode used in the present embodiment is line inversion driving in which a polarity of a voltage applied to the liquid crystal layer of the pixel formation sections is inverted every line of the display section and is inverted every frame.

The display control circuit 7 receives an image signal DAT and a timing control signal TS that are externally supplied, and outputs a digital image signal DV, and a source start pulse signal SSP, a source clock signal SCK, a latch strobe signal LS, a gate start pulse signal GSP, a gate clock signal GCK, and a polarity inversion signal φ, each of which is for controlling timing at which an image is displayed on the display section. The display control circuit 7 carries out, with respect to the image signal DAT thus received, appropriate correction (gamma correction etc.) for compensating a difference (color shift etc. occurring in accordance with environment illuminance) in display characteristic (gamma characteristic etc.) between the normal display area A1 and the display area end portion A2, and then outputs the image signal DAT as the digital image signal DV (corrected image signal). This operation and the arrangement are described later in detail.

The video signal line driving circuit 8 serves as a driving section which drives the display elements in accordance with the digital video signal DV. The video signal line driving circuit 8 receives, from the display control circuit 7, the digital image signal DV, the source start pulse signal SSP, the source clock signal SCK, and the latch strobe signal LS, and supplies a driving video signal to each of the video signal lines SL(1) through SL(M) so as to charge a pixel capacitor of each of the pixel formation sections within the display section. In the video signal line driving circuit 8, digital image signals DV indicative of voltages to be applied to the video signal lines SL(1) through SL(M) are sequentially kept at timings when pulses of source clock signals SCK are generated.

Then, the digital image signals DV thus kept are converted into analog voltages at timings when pulses of latch strobe signals LS are generated. The analog signals thus obtained are simultaneously applied, as the driving video signals, to all of the video signal lines SL(1) through SL(M). That is, in the present embodiment, line sequential driving is adopted as a driving mode for driving the video signal lines SL(1) through SL(M). Note that a polarity of a video signal applied to each of the video signal lines SL(1) through SL(M) is inverted for AC driving of the display section in response to the polarity inversion signal φ.

The scanning signal line driving circuit 9 sequentially supplies active scanning signals to the scanning signal lines GL(1) through GL(N) in response to the gate start pulse signal GSP and the gate clock signals GCK supplied from the display control circuit 7.

The common electrode driving circuit 11 generates a common electrode Vcom that is a voltage to be applied to the common electrode of the liquid crystals. In the present embodiment, it is assumed that an electric potential of the common electrode is also changed in accordance with the AC driving so as to reduce an amplitude of a voltage applied to a video signal line. The common electrode driving circuit may be provided in the display control circuit 7 or in the scanning signal line driving circuit 9.

The photosensor 100 detects external light (sunlight etc.) from around the display panel, i.e., environment illuminance, outputs an analog signal corresponding to the level of the environment illuminance thus detected, and causes an A/D converter (not shown) attached outside the photosensor 100 to convert the analog signal into a digital signal and to output the digital signal. The A/D converter may be attached inside the photosensor 100. In this case, a digital signal is outputted from the photosensor 100. The digital signal, i.e., an illuminance signal LK is supplied to the display control circuit 7.

The driving video signals are thus applied to the video signal lines SL(1) through SL(M), and the scanning signals are thus applied to the scanning signal lines GL(1) through GL(N). This controls light transmittance of the liquid crystal layer. Thus, an image is displayed on the display section of the liquid crystal display panel 2.

Figure 4:
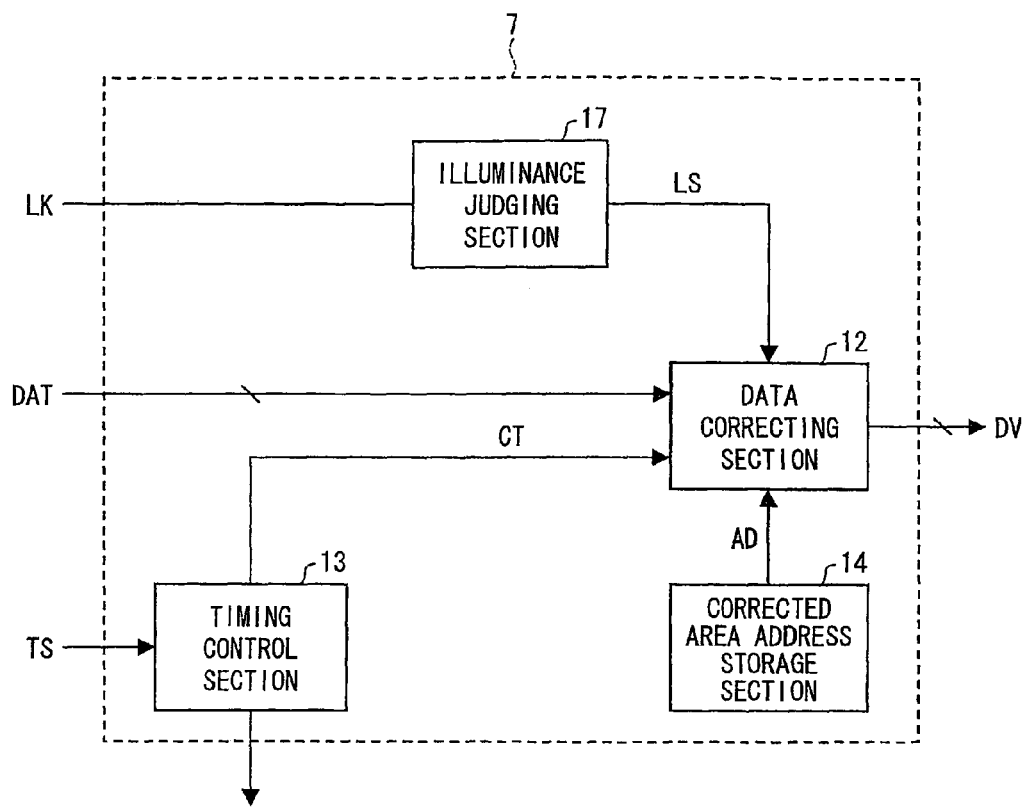
FIG. 4

FIG. 4 is a block diagram illustrating an overall arrangement of the display control circuit 7 of the present embodiment. The display control circuit 7 includes a timing control section 13, a corrected area address storage section 14 (corrected position storage section), a data correcting section 12, and an illuminance judging section 17. The timing control section 13 controls timings at which signals are transferred between the sections constituting the liquid crystal display device. The corrected area address storage section 14 stores a corrected area address AD (later described) as information specifying positions of the display elements disposed in the display area end portion A2 out of the display elements disposed in a matrix. The data correcting section 12 (a) receives a pixel value (display gradation data) contained in a display data signal DAT supplied from an outside the device, (b) compares positional information, on the display area, of a display element to which the pixel value is to be given with the corrected area address AD stored in the corrected area address storage section 14 so as to specify the display element belonging to the display area end portion A2, and (c) corrects the pixel value given to the display element thus specified. The illuminance judging section 17 receives an inputted illuminance signal LK, judges an environment illuminance based on the illuminance signal LK, and supplies, to the data correcting section 12, an illuminance judgment signal LS indicative of the environment illuminance thus judged.

The timing control section 13 shown in FIG. 4 receives a timing control signal TS that is externally supplied, and outputs a control signal. CT for controlling operation of the data correcting section 12, and a source start pulse signal SSP, a source clock signal SCK, a latch strobe signal LS, a gate start pulse signal GSP, a gate clock signal GCK, and a polarity inversion signal φeach for controlling timing at which an image is displayed on the display section of the liquid crystal display panel 2.

Out of addresses on each RAM for RGB (later described) included in the data correcting section 12, the corrected area address storage section 14 stores addresses (corrected area addresses AD) of a plurality of memory cells in which pixel values to be given to the display elements disposed in the display area end portion A2 are stored, as an example of information for specifying positions of the display elements to which image signals to be corrected are supplied out of the display elements disposed in a matrix.

Note that the information for specifying the positions of the display elements to be corrected is not limited to an address on the RAM. In other words, it is only necessary that the positions of the display elements disposed in a matrix be specified. Accordingly, it is also possible that a two-dimensional coordinate system be applied to the matrix so that the positions of the display elements can be specified by x and y coordinates.

The illuminance judging section 17 receives the illuminance signal LK supplied directly from the photosensor 100 or via the A/D converter or the like, determines environment illuminance, and outputs an illuminance judgment signal LS in accordance with a result of the judgment.

The data correcting section 12 receives a pixel value (display gradation data) contained in the display data signal DAT, causes the pixel value to be (temporarily) stored in the RAM (later described), and memorizes an address of a memory cell in the RAM in which the pixel value is stored. Then, the data correcting section 12 sequentially reads out pixel values stored in the RAM in response to the control signal CT from the timing control section 13. In a case where an address of a pixel value thus read out matches any of the corrected area addresses AD stored in the corrected area address storage section 14, the data correcting section 12 corrects the pixel value based on the illuminance judgment signal LS supplied from the illuminance judging section. The following describes, in detail, arrangement and operation of the data correcting section 12 with reference to FIG. 5.

FIG. 5 is a block diagram illustrating an arrangement of the data correcting section 12 included in the display control circuit 7 of the present embodiment. The data correcting section 12 includes a RAM 101 for blue, a RAM 102 for green, a RAM 103 for red, a RAM control section 15, and a corrected area control section 16. In the RAM 101 for blue, a look-up table (hereinafter referred to as LUT) for correction of display data DATb for blue pixels disposed in the display area end portion A2 is stored. In the RAM 102 for green, an LUT for correction of display data DATg for green pixels disposed in the display area end portion A2 is stored. In the RAM 103 for red, an LUT for correction of display data DATr for red pixels disposed in the display area end portion A2 is stored. The RAM control section 15 controls the RAM 101 for blue, the RAM 102 for green, and the RAM 103 for red (hereinafter collectively referred to as "RAMs for RGB"). The corrected area control section 16 gives an instruction to correct pixel values of pixels disposed in the display area end portion A2.

Although the present embodiment deals with a case where the LUTs are used, it is also possible that no LUT is used. For example, it is also possible that calculation of multiplying pixel values contained in the image signals DAT by a correction coefficient be performed. The RAMs for RGB are realized by three semiconductor chips. Alternatively, the RAMs for RGB may be three different storage areas in a single semiconductor chip or part of a semiconductor memory or the like constituting the corrected area address storage section 14.

The RAM control section 15 receives the control signal CT supplied from the timing control section 13 and the illuminance judgment signal LS supplied from the illuminance judging section 17, and outputs a RAM control signal CS based on these signals. The RAM control signal CS contains, for example, addresses of memory cells in the RAM 101 for blue in which memory cells the pixel values contained in the display data DATb for the blue pixels are sequentially stored, and a read address for designating an appropriate LUT based on the illuminance judgment signal LS out of the LUTs stored in each of the RAMs for RGB.

The corrected area control section 16 receives the RAM control signal CS from the RAM control section 15, and acquires, from the RAM control signal CS, an address of a memory cell corresponding to a pixel value that is being written into the RAMs for RGB. Then, the corrected area control section 16 compares the address of the memory cell thus acquired with a corrected area address AD read out from the corrected area address storage section 14. In a case where the address of the memory cell thus acquired matches the corrected area address AD, the corrected area control section 16 reads out a pixel value from the memory cell having this address, and gives the RAMs for RGB a correction instruction signal SS for instructing the RAMs for RGB to supply the pixel value thus read out to an LUT designated by the RAM control section 15.

The RAMs for RGB can include plural types of LUTs corresponding to respective environment illuminances. In the present embodiment, as a method for improving the problem that display light of an image is shifted towards yellow in accordance with the intensity of external light entering the light guide element 4, only the RAM 101 for blue includes plural types of LUTs corresponding to respective environment illuminances so that luminance of blue that is complementary to yellow can be corrected.

Of course, since the tendency of color shift of transmitted light varies depending on a material of the fiber plate, a color shift of a red image signal DATr may be corrected, a color shift of a green image signal DATg may be corrected, or color shifts of image signals of two or more colors out of the three colors may be corrected. Further, the RAMs for RGB may include an LUT for further correcting an image signal DAT so as to compensate attenuation and coloring of light which occurs in a case where light emitted from a display element passes through the light guide element 4, or such an LUT may be incorporated into one of the plural types of LUTs corresponding to the respective environment illuminances.

Figure 6:
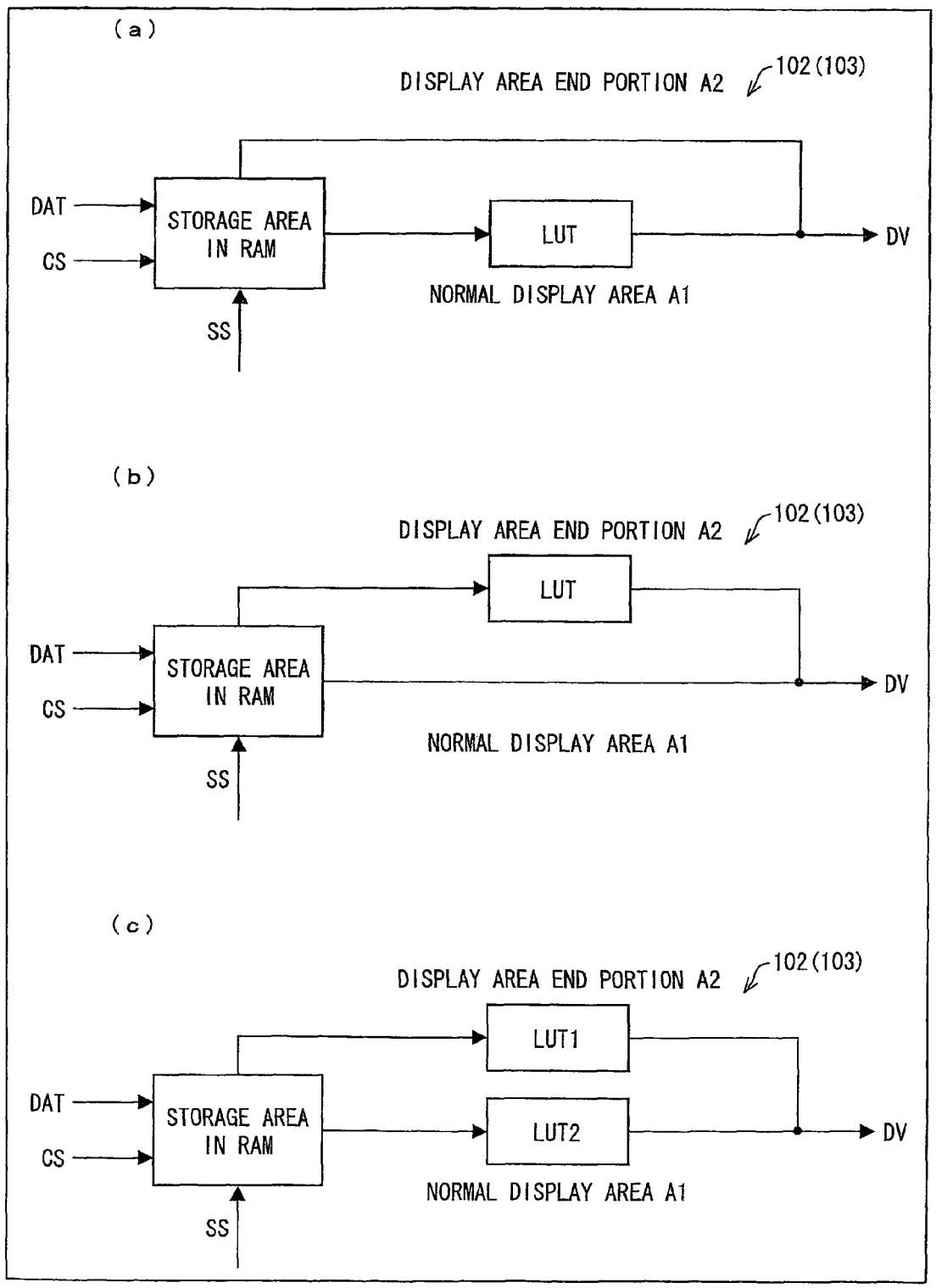
FIG. 6
Figure 7:
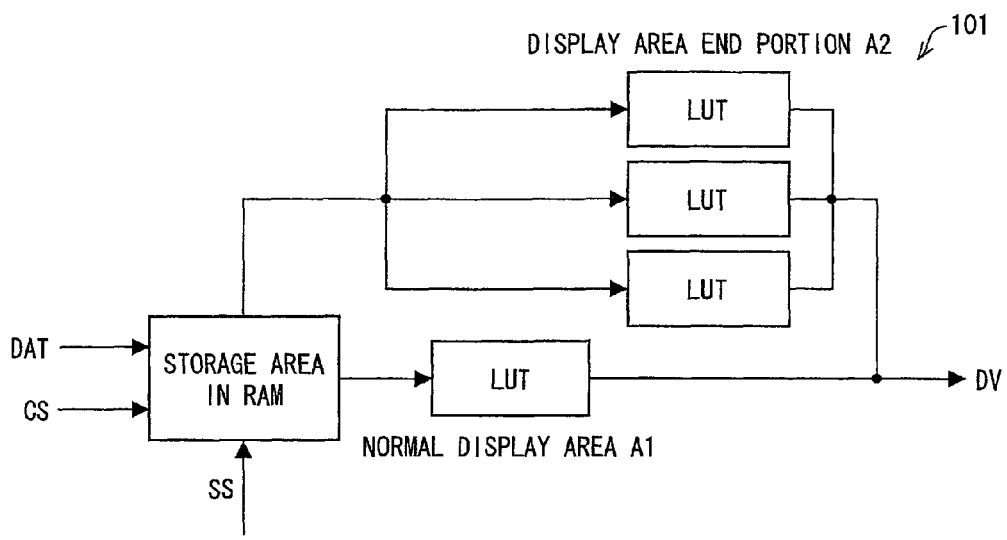
FIG. 7

FIGS. 6 and 7 are diagrams each illustrating an internal arrangement of the RAMs for RGB. FIG. 6 shows a RAM for a color which is not corrected in accordance with the illuminance judgment signal LS, for example, the RAM for green and the RAM for red shown in FIG. 5. (a) of FIG. 6 shows a case where only an LUT corresponding to the normal display area A1 is provided, (b) of FIG. 6 shows a case where only an LUT corresponding to the display area end portion A2 is provided, and (c) of FIG. 6 shows a case where both of (i) the LUT corresponding to the normal display area A1 and (ii) the LUT corresponding to the display area end portion A2 are provided.

Even under a dark room environment, light emitted from a display element is absorbed by a light guide element while passing through the light guide element. This causes a reduction in luminance. Further, a color shift occurs, for example, because the light guide element absorbs a light component (e.g., blue light) of a specific range of wavelengths relatively well.

Accordingly, it is preferable that LUTs for correcting image signals DAT for RGB be stored in the respective RAMs for RGB so that it is possible to compensate at least one of a reduction in luminance and a color shift that are caused by the light guide element placed under a condition in which influence of external light can be ignored. In the present embodiment, the LUT stored in the RAM for green or the RAM for red stores correction values for correcting image signals indicative of the same gradation so that a gamma characteristic of the normal display area A1 matches a gamma characteristic of the display area end portion A2, i.e., so that display in the normal display area A1 and display in the display area end portion A2 are carried out at the same luminance.

In the case of (a) of FIG. 6, in a case where the correction instruction signal SS is not supplied to the RAM 102 for green for example, the lower route in (a) of FIG. 6 is taken so that an LUT designated by the RAM control signal CS is used. Specifically, a pixel value corresponding to the normal display area A1 instructed by the RAM control signal CS is read out from a storage area of the RAM 102 for green, is corrected by the LUT, and is then outputted as a corrected image signal DV.

In a case where the correction instruction signal SS is supplied to the RAM 102 for green, the upper route in (a) of FIG. 6 is taken. Specifically, a pixel value corresponding to the display area end portion A2 instructed by the RAM control signal CS is read out from the storage area of the RAM 102 for green, and is then outputted as a corrected image signal DV without being corrected.

In the case of (b) of FIG. 6, in a case where the correction instruction signal SS is supplied to the RAM 102 for green for example, the upper route in (b) of FIG. 6 is taken so that an LUT designated by the RAM control signal CS is used. Specifically, a pixel value corresponding to the display area end portion A2 instructed by the RAM control signal CS is read out from the storage area of the RAM 102 for green, is corrected by the LUT so that at least one of a reduction in luminance and a color shift is suppressed, and is then outputted as a corrected image signal DV.

In a case where the correction instruction signal SS is not supplied to the RAM 102 for green, the lower route in (b) of FIG. 6 is taken. Specifically, a pixel value corresponding to the normal display area A1 instructed by the RAM control signal CS is read out from the storage area of the RAM 102 for green, and is then outputted as a corrected image signal DV without being corrected.

In the cases of (a) and (b) of FIG. 6, a display characteristic of the display area end portion A2 is used as a standard, and correction of adjusting a display characteristic of the normal display area A1 to the display characteristic of the display area end portion A2 is carried out. Alternatively, the display characteristic of the normal display area A1 is used as a standard, and correction of adjusting the display characteristic of the display area end portion A2 to the display characteristic of the normal display area A1 is carried out. In these cases, it is possible to produce an effect that the number of LUTs is reduced, thereby making a RAM capacity smaller, as compared with the case of (c) of FIG. 6.

Meanwhile, in (c) of FIG. 6, in a case where the correction instruction signal SS is supplied to the RAM 102 for green, the upper route in (c) of FIG. 6 is taken so that the LUT1 designated by the RAM control signal CS is used. Specifically, a pixel value corresponding to the display area end portion A2 is read out from a storage area of the RAM 102 for green, is corrected by the LUT1, and is then outputted as a corrected image signal DV.

In a case where the correction instruction signal SS is not supplied to the RAM 102 for green, the lower route in (c) of FIG. 6 is taken so that the LUT2 designated by the RAM control signal CS is used. Specifically, a pixel value corresponding to the normal display area A1 is read out from a storage area of the RAM 102 for green, is corrected by the LUT2, and is then outputted as a corrected image signal DV.

In the case of (c) of FIG. 6, a gamma characteristic used as a standard is determined in advance, and correction of adjusting each of the gamma characteristic of the normal display area A1 and the gamma characteristic of the display area end portion A2 to the gamma characteristic used as a standard is carried out. Further, in this case, both of (i) image signals DAT corresponding to the normal display area A1 and (ii) image signals DAT corresponding to the display area end portion A2 can be corrected. This produces an effect that a difference in gamma characteristic between these areas can be reduced and an effect that an optimum gamma characteristic can be obtained.

FIG. 7 shows a RAM (e.g., the RAM 101 for blue of FIG. 5) for a color that is corrected in accordance with the illuminance judgment signal LS. FIG. 7 shows a case where the RAM includes (i) three LUTs corresponding to the display area end portion A2 from which LUTs an LUT is selected in accordance with the illuminance judgment signal LS and (ii) one LUT corresponding to the normal display area A1.

First, in a case where the correction instruction signal SS is not supplied to the RAM 101 for blue, the lower route in FIG. 7 is taken. Specifically, a pixel value corresponding to the normal display area A1 instructed by the RAM control signal CS is read out from a storage area of the RAM 101 for blue, is corrected by the LUT, and is then outputted as a corrected image signal DV.

Next, in a case where the correction instruction signal SS is supplied to the RAM 101 for blue, the upper route in FIG. 7 is taken. Specifically, a pixel value corresponding to the display area end portion A2 instructed by the RAM control signal CS is read out from the storage area of the RAM 101 for blue, is corrected by an LUT selected from the three LUTs by the RAM control signal CS in accordance with the illuminance judgment signal LS, and is then outputted as a corrected image signal DV.

Note that as for the normal display area A1, the correction using the LUT can be omitted as in (b) of FIG. 6. Note also that the number of types of the LUTs from which an LUT is selected in accordance with the illuminance judgment signal LS is not limited to three, provided that at least two types of LUTs are used.

Figure 8:
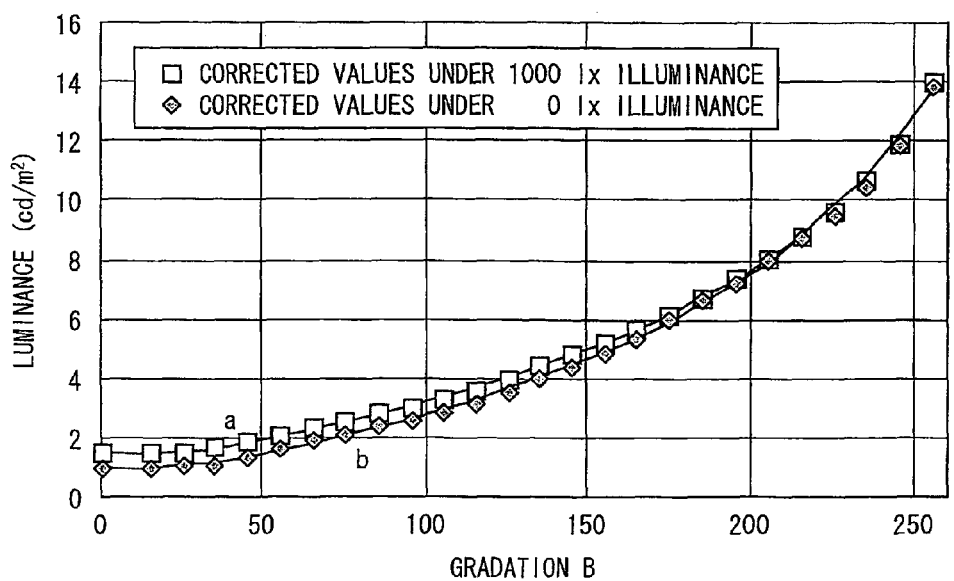
FIG. 8

FIG. 8 shows gamma characteristics of the liquid crystal display panel 2 for a corrected blue image signal, the blue image signal being corrected so that coloring of light emitted from the liquid crystal display device caused by external light entering the light guide element 4 is reduced. In FIG. 8, the curve b shows a case where the environment illuminance is 0 lux (hereinafter represented by lx), and the curve a shows a case where the environment illuminance is 1000 lx.

In the case where the environment illuminance is 0 lx, a color shift arising from external light does not occur. Accordingly, the gamma characteristic does not change between before and after color shift correction. However, even in the case where the environment illuminance is 0 lx, in the display area end portion A2, light emitted from a display element undergoes a reduction in luminance and a color shift caused by the light guide element 4. Accordingly, gamma correction for compensating the reduction in luminance or the color shift is carried out. The curve b of FIG. 8 shows a gamma characteristic achieved after an image signal DAT is corrected so that at least one of the reduction in luminance and the color shift is compensated, in a case where the environment illuminance is 0 lx.

Figure 14:
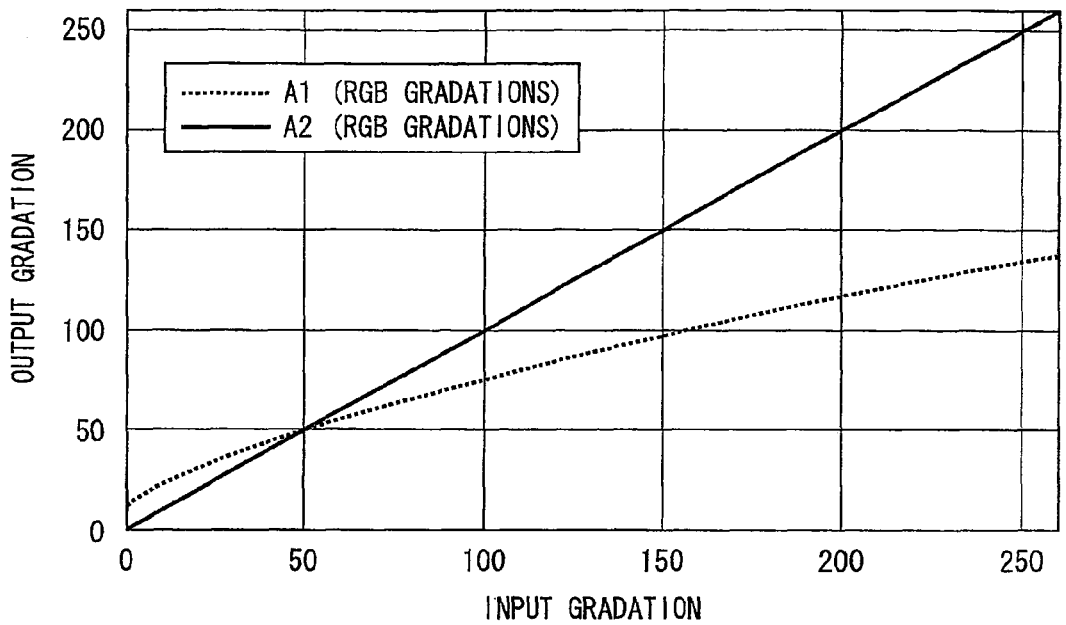
FIG. 14
Figure 15:
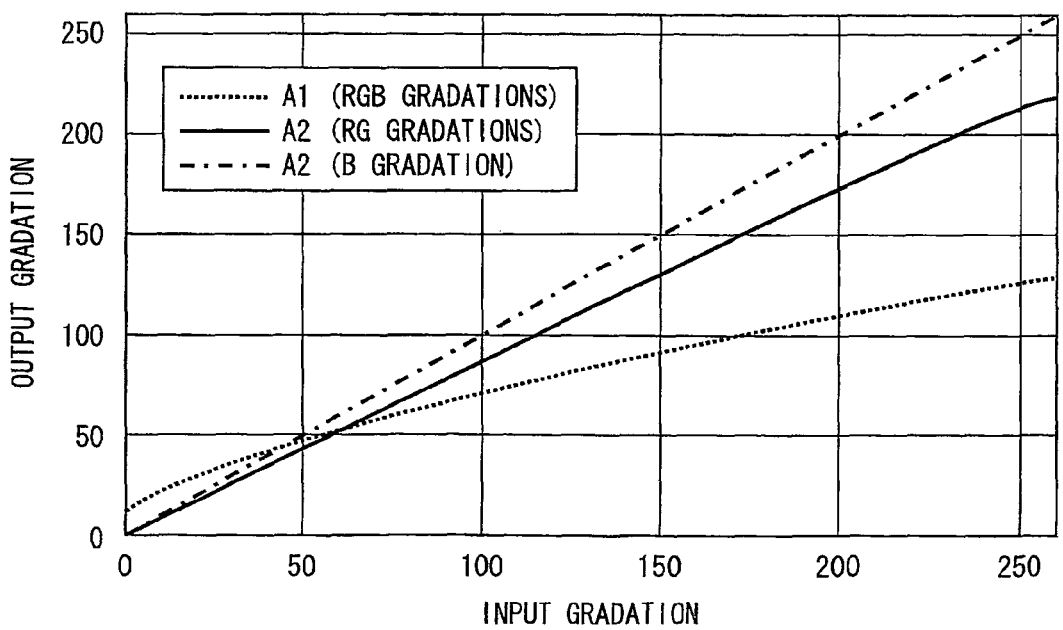
FIG. 15
Figure 16A:
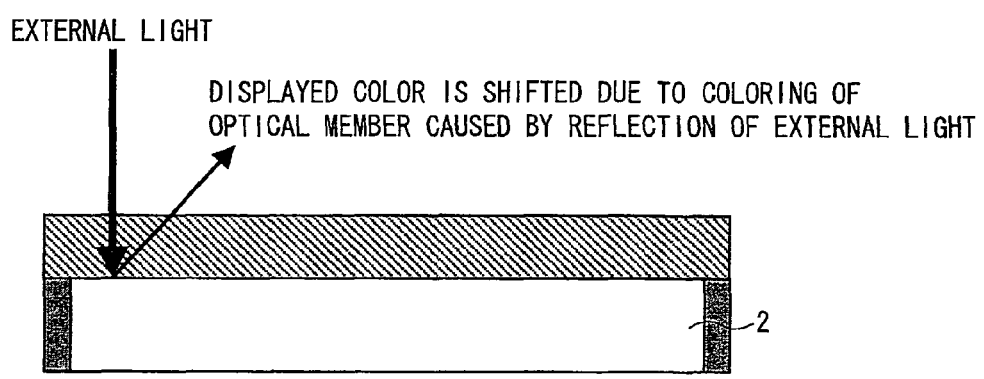
Figure 16B:
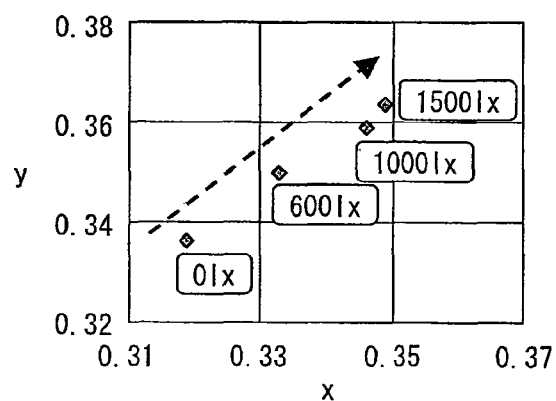
FIG. 16b

FIG. 14 is a graph showing gamma correction curves for achieving matching in luminance between the normal display area A1 and the display area end portion A2 under a dark room environment, i.e., in a case where the environment illuminance is 0 lx. FIG. 15 is a graph showing gamma correction curves for achieving matching in luminance and tinge between the normal display area A1 and the display area end portion A2 under a dark room environment.

In a case where a reduction in luminance caused in the display area end portion A2 by the light guide element 4 is compensated, luminance of the normal display area A1 is adjusted to the luminance of the display area end portion A2 by reducing the luminance of the normal display area A1, as indicated by output gradations for input gradations shown in FIG. 14. For example, an output gradation for the input gradation 255 is 255 in the display area end portion A2, but is about 138 in the normal display area A1. Thus, the luminance of the normal display area A1 is reduced.

However, in a low gradation range including the input gradation 0, the luminance of the normal display area A1 is increased as one method. This is because the present embodiment employs a method of achieving matching between luminance of the normal display area A1 and luminance of the display area end portion A2 as follows. Specifically, the luminance of the display area end portion A2 is increased by making a light emission amount of the backlight device 3 larger in the display area end portion A2 than in the normal display area A1 so as to compensate a reduction in luminance in the display area end portion A2 caused by the light guide element 4.

In the gamma correction shown in FIG. 14, it is assumed that display elements of RGB are the same in amount of reduction in luminance. Accordingly, an LUT common for RGB is prepared.

Meanwhile, in a case where a reduction in luminance and a color shift that are caused in the display area end portion A2 by the light guide element 4 are compensated, luminance of the normal display area A1 is adjusted to the luminance of the display area end portion A2 first by reducing the luminance of the normal display area A1 as in the case of FIG. 14, as indicated by output gradations for input gradations shown in FIG. 15. Note, however, that after the correction, the maximum luminance in the normal display area A1 and the maximum luminance in the display area end portion A2 are slightly lower than those in the case of FIG. 14. This is because output gradations for B in the display area end portion A2 are made maximum and output gradations for R and G in the display area end portion A2 are lowered so that the color shift is corrected.

As shown in FIG. 15, in order to correct the color shift, the gamma correction curve for B in the display area end portion A2 is made different from the gamma correction curve for R and G in the display area end portion A2. Accordingly, an LUT for B in the display area end portion A2 and another LUT common to R and G in the display area end portion A2 are prepared.

Meanwhile, in a case where the environment illuminance is 1000 lx, it becomes clear, from a comparison between the curve a and the curve b, that a color shift correction of increasing luminance of blue light is carried out especially at low gradations. This is because a color shift caused by environment illuminance is large in a case where illuminance of external light is relatively large as compared to illuminance of light emitted from the display device, as described above.

Figure 9:
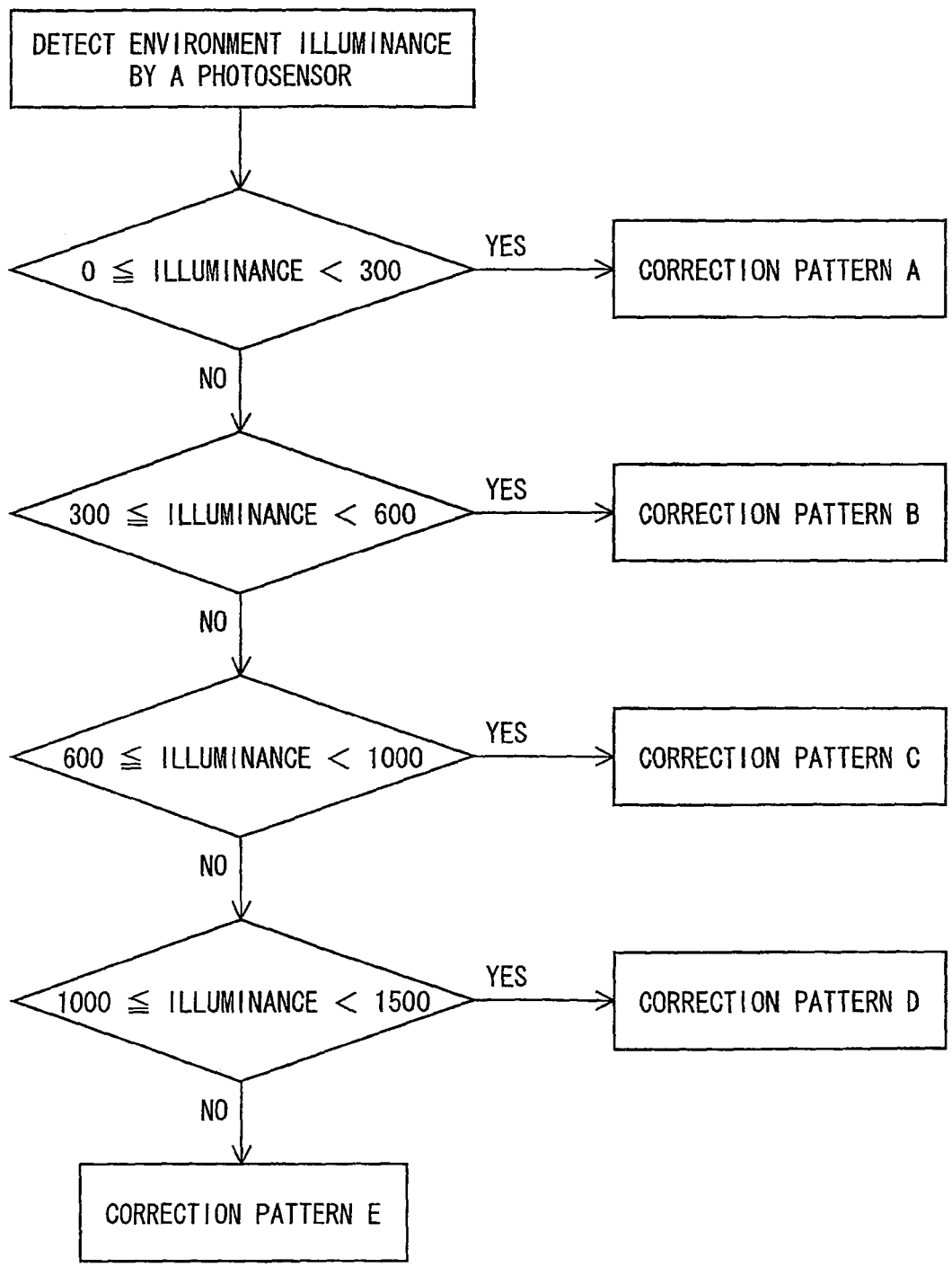
FIG. 9

FIG. 9 is a flow chart for selecting an image signal correction pattern in accordance with the environment illuminance detected by the photosensor 100. A correction pattern A is used in a case where the environment illuminance is not less than 0 lx and less than 300 lx, a correction pattern B is used in a case where the environment illuminance is not less than 300 lx and less than 600 lx, a correction pattern C is used in a case where the environment illuminance is not less than 600 lx and less than 1000 lx, a correction pattern D is used in a case where the environment illuminance is not less than 1000 lx and less than 1500 lx, and a correction pattern E is used in a case where the environment illuminance is not less than 1500 lx.

In a case where luminance of blue image signals at the same gradation in these correction patterns is adjusted to satisfy the following relationship: correction pattern A≤correction pattern B≤correction pattern C≤correction pattern D≤correction pattern E, it is possible to more effectively correct coloring of the light guide element caused by reflection of external light.

Note that the corrected area control section 16 may determine whether or not a display data signal DAT is the one that should be supplied to the display area end portion A2 after the illuminance judging section 17 judges environment illuminance on the basis of the illuminance signal LK, but the determination of the corrected area control section 16 may be carried out before the environment illuminance judgment process. In this case, the environment illuminance judgment process is carried out after it is determined that a display data signal DAT is the one that should be supplied to the display area end portion A2. This eliminates the need to carry out an unnecessary environment illuminance judgment process.

[Embodiment 2]

Another embodiment of the present invention is described below with reference to FIGS. 10 through 13. For convenience of description, constituent members having identical functions to those shown in the drawings of Embodiment 1 are given identical reference numerals, and are not explained repeatedly.

FIG. 10 is a plan view illustrating a display device 1. The display device 1 includes display panels 2, light guide elements 4, and a photosensor 100. The photosensor 100 can be provided in any position in the display device 1, as long as environment illuminance can be measured. FIG. 10 shows an example in which a single photosensor 100 is provided on an outer frame of a display panel 2. Alternatively, the photosensor 100 may be provided so as to be adjacent to a pixel formation section (display element) in a normal display area A1 of the display panel 2 or may be provided so as to be incorporated in a pixel formation section. In this case, the photosensor can be formed concurrently with the pixel formation section by a single process. This eliminates the need to separately provide a photosensor on an outer surface of the display device, thereby producing effects of a reduction in the number of processes and a reduction in manufacturing cost.

Figure 11A:
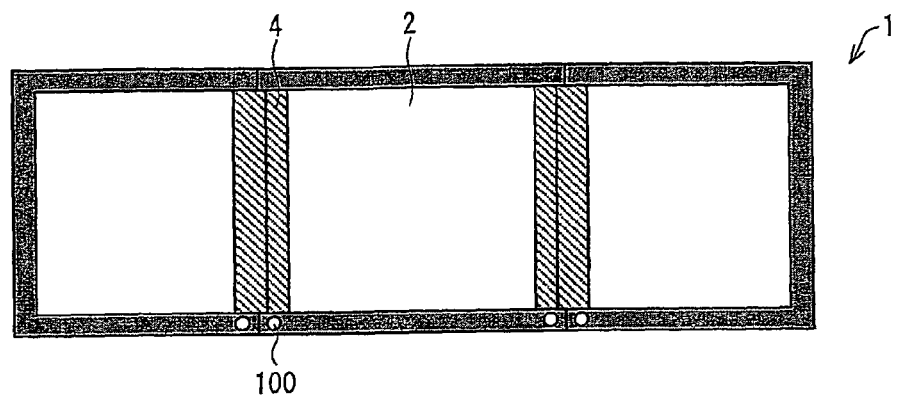
Figure 11B:
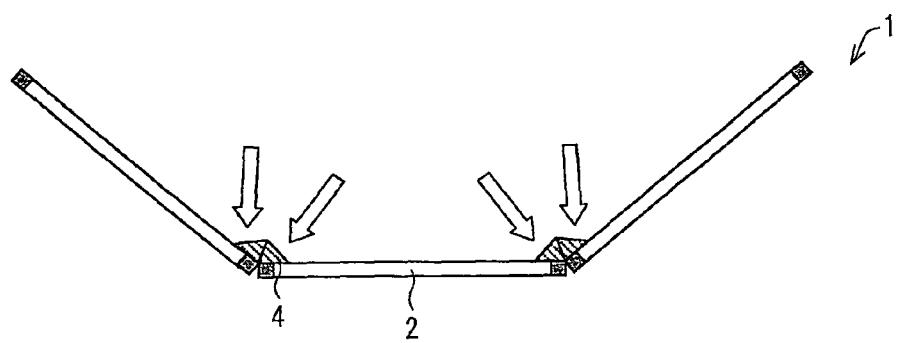
FIG. 11b
Figure 11C:
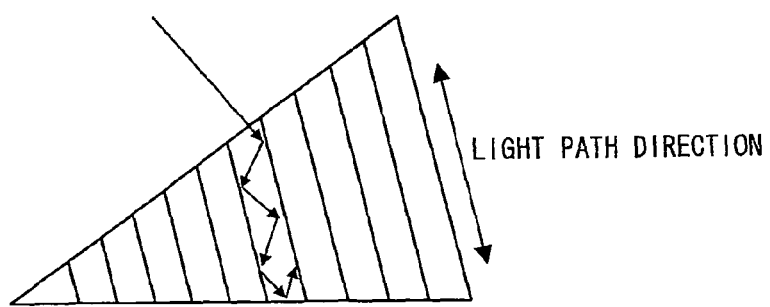
FIG. 11c

FIGS. 11a through 11c are diagrams schematically illustrating a display device that is different from that of FIG. 10. FIG. 11a is a plan view illustrating the display device, FIG. 11b is a cross-sectional view illustrating the display device, and FIG. 11c is a cross-sectional view illustrating a fiber plate provided in the display device. The display device 1 of FIG. 11a includes display panels 2, light guide elements 4, and photosensors 100, as in the case of FIG. 10. However, the photosensors 100 are provided in the vicinity of the light guide elements 4. This makes it possible to carry out image signal correction accurately reflecting illuminance of external light emitted into the light guide elements 4.

In a case where a plurality of light guide elements 4 are provided in the display device 1 as shown in FIGS. 11a and 11b, it is preferable that the same number of photosensors 100 as the light guide elements 4 be provided in the vicinity of the respective light guide elements 4.

Further, the following arrangement produces a better effect. In a fiber plate used as a light path changing member, light paths in a specific direction are present. Specifically, as shown in FIG. 11c, out of external light entering the fiber plate, light entering the fiber plate at an angle larger than a critical angle with respect to an internal surface of a fiber is totally reflected in the fiber repeatedly, and reaches a display side. Accordingly, a light path extending in a direction in which the fiber extends is formed. Out of external light, the light traveling along this light path while being totally reflected in the fiber causes a color shift. On this account, photosensors for detecting environment illuminance must efficiently detect the light traveling along the light path of the fiber plate. Accordingly, it is desirable that the photosensors be provided at optimum angles with respect to respective fiber plates. Alternatively, it is also desirable to adopt a structure in which light entering at an angle at which light does not influence coloring of a fiber plate is blocked.

For the above reason, it is more desirable that (i) the photosensors 100 be provided so as to be adjacent to the respective fiber plates that are different in direction of a light path, as shown in FIGS. 11a and 11b and (ii) image signals in regions corresponding to the respective fiber plates be corrected based on illuminance judgment signals detected by the respective photosensors 100. Even in a case where light path changing means which is not a fiber plate is used, it is desirable that a photosensor be provided in accordance with a light path of the light path changing means.

Figure 12A:
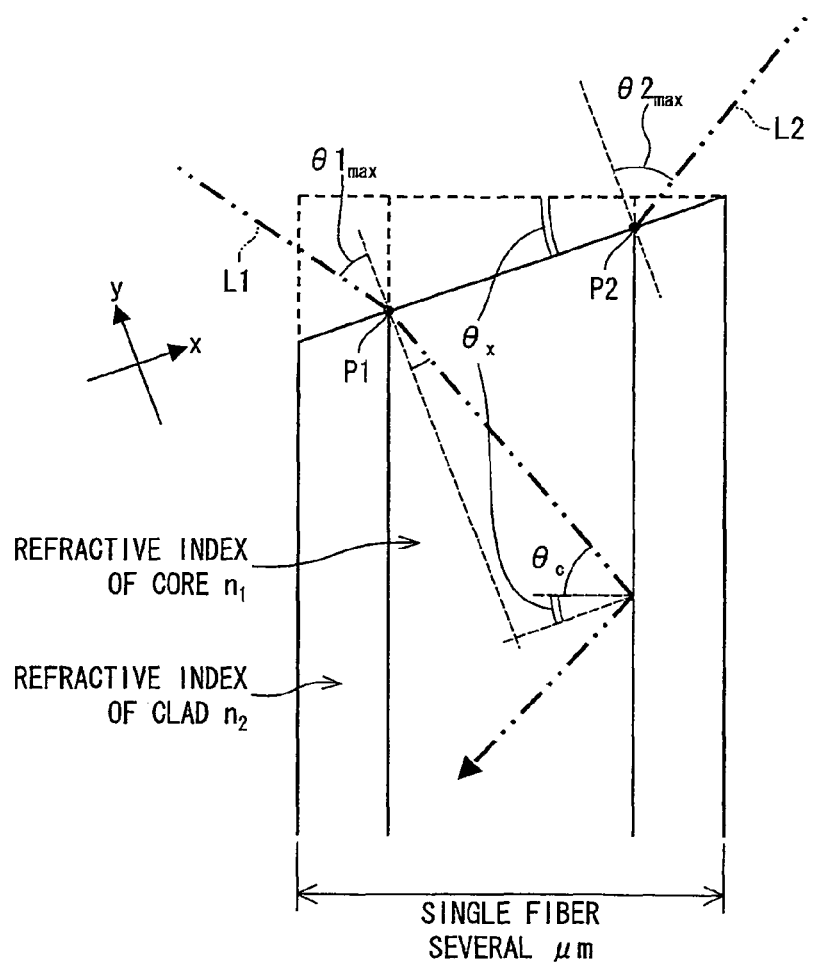
Figure 12B:
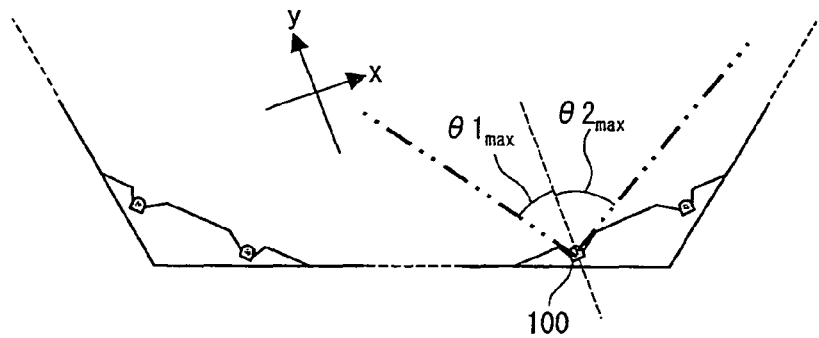
FIG. 12b

Next, the following describes how an optimum value of a detection angle of a photosensor is obtained, with reference to FIGS. 12a and 12b. The following description focuses on a single fiber, as shown in FIG. 12a. In a case where light enters from air into core glass, a range of angles at which light can enter the fiber is defined by the following equations:

$$\sin\theta_{1max} = n_1 \sin(90°-\theta_c-\theta_x) \quad 0°\leq\theta_{1max}\leq 90°$$

$$\sin\theta_{2max} = n_1 \sin(90°-\theta_c+\theta_x) \quad 0°\leq\theta_{2max}\leq 90°$$

It is assumed that an end surface of the fiber is tilted at an angle of $\theta_x°$ in a counterclockwise direction with respect to a horizontal direction and that the counterclockwise direction is a positive direction of an angle formed with respect to a positive direction of an x-axis of an x-y coordinate system formed by the x-axis parallel to the end surface of the fiber and a y-axis perpendicular to the x-axis. In a cross-section of the fiber taken along a x-y plane, clad glass (hereinafter referred to as clad), core glass (hereinafter referred to as core), and clad are arranged in this order in the positive direction of the x-axis. A point at which light L1 traveling at an angle of 90° to 180° with respect to an end surface of the core out of the end surface of the fiber enters the core is referred to as P1, and a point at which light L2 traveling at an angle of 0° to 90° with respect to the end surface of the fiber enters the core is referred to as P2.

An absolute value of a maximum incident angle at which the light L1 is allowed to enter the core from P1 and travel through the core while being totally reflected is defined as $\theta_{1max}$, which is measured on the basis of a positive direction of the y-axis, and an absolute value of a maximum incident angle at which the light L2 is allowed to enter the core from P2 and travel through the core while being totally reflected is defined as $\theta_{2max}$, which is measured on the basis of the positive direction of the y-axis. $\theta_c$ represents a critical angle determined by a refractive index $n_1$ of the core and a refractive index $n_2$ of the clad, and is defined by the following equation:

$$\sin\theta_c = n_2/n_1$$

Out of the light L1, light whose incident angle (absolute value) to the y-axis is larger than $\theta_{1max}$ can enter the core, but is not totally reflected and is leaked at a core-clad boundary surface. Accordingly, influence of such light on coloring of display light in a fiber plate portion is small. That is, a photosensor needs to detect light whose incident angle (absolute value) to the y-axis is smaller than $\theta_{1max}$ since such light can be considered to have a large influence on coloring of display light in the fiber plate portion.

Similarly, as for the light L2, the photosensor needs to detect light whose incident angle (absolute value) to the y-axis is smaller than $\theta_{2max}$. Accordingly, it is more desirable that a photosensor for detecting environment illuminance be disposed so as to detect only light which enters the core at an angle falling in a range of $\theta_{1max}$ from a line vertical to the end surface of the core in the counterclockwise direction and in a range of $\theta_{2max}$ from the line vertical to the end surface of the core in a clockwise direction (maximum range is $\theta_{1max}+\theta_{2max}$), as shown in FIG. 12b.

FIG. 12b shows installation base members 21 each having a tilted surface tilted at an angle of $\theta_{1max}$ to a direction vertical to the end surface of the core (the positive direction of the y-axis) in the counterclockwise direction and a tilted surface tilted at an angle of $\theta_{2max}$ to the direction vertical to the end surface of the core (the positive direction of the y-axis) in the clockwise direction. Each of the photosensors 100 is provided in an innermost part of a concavity formed by these tilted surfaces. The installation base members 21 are made of a light-shielding material. Use of the installation base members 21 having such an arrangement makes it possible to block light whose influence on coloring on display light is small.

It is also possible that the photosensors 100 be disposed between the light guide elements 4 and the display panels 2 so as to detect light that has passed through the light guide elements 4. In this case, color shift correction of image signals can be carried out more accurately since an amount of external light entering the light guide elements 4 can be detected.

In a case where the photosensors 100 are the ones that can detect a wavelength range including a wavelength range absorbed by the light guide elements 4, it is possible to detect a light amount absorbed by the light guide elements regardless of the type of light sources, thereby making it possible to accurately correct a color shift caused by external light reflection.

Figure 13A:
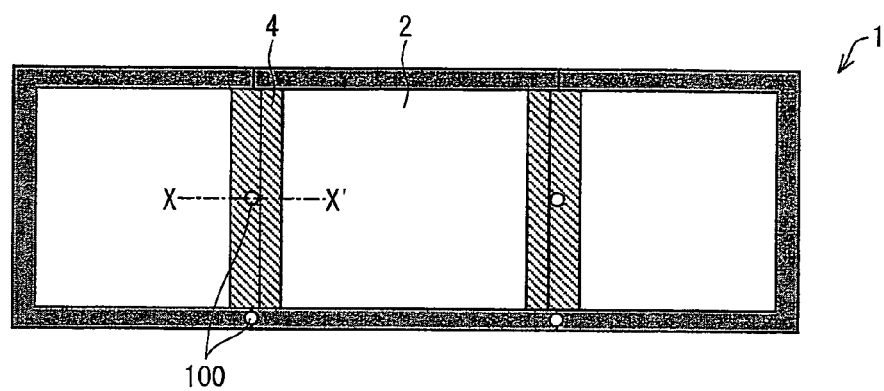
Figure 13B:
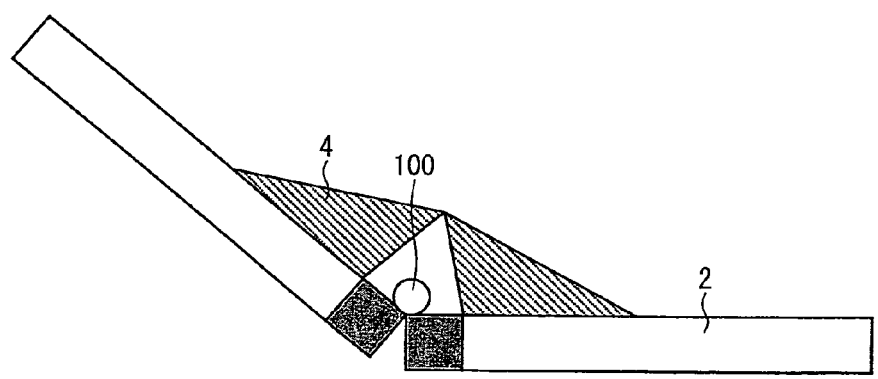
FIG. 13b

As shown in the elevation view of FIG. 13a and the cross-sectional view of FIG. 13b, it is also possible that a photosensor 100 be disposed both at a position at which light that has passed through the light guide element 4 can be detected and at a position at which light that does not pass through the light guide element 4 can be detected so that image signal correction is carried out in accordance with a difference in environment illuminance measured by the photosensors 100. In this case, it is possible to more accurately detect an amount of light passing through a light guide element. Consequently, it is possible to more accurately carry out color shift correction of image signals.

The photosensors may be an RGB color sensor which has different sensitivities for RGB and which can detect illuminances (light amounts) of RGB concurrently. In this case, it is possible to detect a light amount of each of RGB color components of external light. This makes it possible to correct image signals DAT of RGB in accordance with color shift amounts of RGB, respectively, thereby allowing a further improvement in accuracy of color shift correction. Further, by employing an arrangement in which light that does not pass through the light guide element is compared with light that has passed through the light guide element, it is possible to more accurately measure a reduction in luminance and a color shift caused by the light guide element, thereby making it possible to more accurately carry out image signal correction.

The present invention is not limited to the description of the embodiments above, but may be altered by a skilled person within the scope of the claims. An embodiment based on a proper combination of technical means disclosed in different embodiments is encompassed in the technical scope of the present invention.

In order to attain the object, the display device of the present invention is arranged such that the at least one display panel includes plural kinds of display elements emitting different colors, and the image signal correcting section corrects an image signal to be supplied to at least one kind of display element.

In the arrangement, a transmittance characteristic of the light guide element exhibits wavelength dependence, and therefore a degree of absorption of light in a certain wavelength band is relatively large. This causes the light guide element to be colored, thereby causing the color shift. For example, in a case where the area where the light guide element is provided is tinged with yellow due to the light guide element, a degree of absorption of a blue wavelength band is relatively large in the light guide element. Accordingly, in order to reduce the yellow tinge, image signals are corrected so that luminance of display elements emitting blue that is complementary to yellow is increased. That is, image signals are corrected so that luminance of display elements emitting a complementary color to a tinge given by the light guide element or a color close to the complementary color is increased.

Alternatively, image signals are corrected so that out of the plural kinds of display elements emitting different colors, (i) luminance of one kind of display element emitting a complementary color to a tinge given by the light guide element or a color closest to the complementary color or (ii) luminance of two kinds of display elements creating the complementary color or the color closest to the complementary color is increased.

As described above, by correcting an image signal to be supplied to at least one kind of display element out of the plural kinds of display elements emitting different colors, it is possible to correct chromaticity in an optimum way or to correct chromaticity and luminance in an optimum way in accordance with a transmittance characteristic of the light guide element.

Further, by appropriately correcting image signals depending on color of display elements, a luminance characteristic of the display element in the area where the light guide element is provided can be further approximated to a luminance characteristic of the display element in the area where the light guide element is not provided, thereby producing an effect of further reducing a sense of strangeness given to a viewer.

In order to attain the object, the display device of the present invention is arranged such that the correction carried out by the image signal correcting section includes correction of reducing coloring of display light of the image caused by external light entering the light guide element.

According to the arrangement, the image signal is corrected in accordance with environment illuminance so that chromaticity shift (coloring) caused by external light entering the light guide element is reduced. This makes it possible to suppress occurrence of a color shift in display of a light guide element portion. As a result, it is possible to produce an effect that display can be carried out also in the frame area while suppressing a difference in chromaticity between the display area in which the display elements are disposed and the frame area where no display element is disposed.

In order to attain the object, the display device of the present invention is arranged such that the correction carried out by the image signal correcting section includes correcting at least one of (i) an image signal to be supplied to a display element in the area where the light guide element is provided and (ii) an image signal to be supplied to a display element in the area where the light guide element is not provided so that at least one of attenuation and coloring of light that occur in a case where light from the display element passes through the light guide element is compensated.

According to the arrangement, as described above, even under a dark room environment or under an environment in which environment illuminance is low and in which an influence of external light can be ignored, display can be carried out also in the frame area while suppressing a difference in luminance or chromaticity between the display area in which the display elements are disposed and the frame area where no display element is disposed, thereby producing an effect that a sense of strangeness is not given to a viewer.

In order to attain the object, the display device of the present invention is arranged such that the image signal correcting section includes: an illuminance judging section which receives an illuminance signal supplied from the at least one photosensor, judges an environment illuminance based on the illuminance signal, and outputs an illuminance judgment signal in accordance with a result of the judgment of the environment illuminance; and a data correcting section which corrects the image signal in accordance with the illuminance judgment signal.

The arrangement produces an effect that it is possible to suppress occurrence of a color shift in display of a light guide element portion.

Note that the data correcting section may correct the image signals in accordance with a correction pattern which varies depending on the environment illuminance indicated by the illuminance judgment signal.

In order to attain the object, the display device of the present invention is arranged such that the image signal correcting section further includes a corrected position storage section which stores positional information specifying a position of a display element subjected to image signal correction out of the plurality of display elements disposed in a matrix.

The arrangement produces an effect that the image signal correcting section can easily specify whether or not a display element to which an image signal is supplied to is a display element subjected to correction by comparing the positional information stored in the corrected position storage section with positional information of the display element to which the image signal is to be supplied to.

The corrected position storage section may store positional information specifying a position of the display element belonging to the area, on the display panel, where the light guide element is provided. In this case, the display element in the area where the light guide element is provided can be set as a display element subjected to image signal correction.

The illuminance judging section may be arranged to (i) judge the environment illuminance in a case where positional information of a display element to which an image signal is to be supplied matches positional information specifying a position of the display element included in the area where the light guide element is provided, and (ii) output the illuminance judgment signal in accordance with a result of the judgment of the environment illuminance. This eliminates the need to carry out unnecessary environment illuminance judgment process for the display element belonging to the area where the light guide element is not provided.

In order to attain the object, the display device of the present invention is arranged such that the at least one photosensor is provided in proximity with the light guide element.

According to the arrangement, it is possible to more accurately measure illuminance of external light passing through the light guide element. This produces an effect that it is possible to more accurately suppress occurrence of a color shift in display of a light guide element portion.

In order to attain the object, the display device of the present invention is arranged such that the at least one photosensor is capable of detecting at least a wavelength range absorbed by the light guide element.

According to the arrangement, in a case which the photosensor is capable of measuring light including a wavelength range absorbed by the light guide element, it is possible to detect a light amount absorbed by the light guide element regardless of the type of light source. This produces an effect that it is possible to accurately correct a color shift caused by reflection of external light.

Note that in a case where the photosensor is the one which measures only light of a wavelength range absorbed by the light guide element, the photosensor can estimate a light amount absorbed by the light guide element regardless of the type of light source. This makes it possible to accurately correct a color shift.

In order to attain the object, the display device of the present invention is arranged such that the at least one photosensor is a color sensor which has different sensitivities for respective colors and which is capable of detecting light amounts of the colors at a same time, and the at least one photosensor includes a photosensor which receives light that has passed through the light guide element and a photosensor which receives light that does not pass through the light guide element.

According to the arrangement, the at least one photosensor provided on the display panel includes a photosensor which receives light that has passed through the light guide element and a photosensor which receives light that does not pass through the light guide element. This makes it possible to detect a difference in color shift amount between the light that passes through the light guide element and the light that does not pass through the light guide element. This allows the image signal correcting section to correct an image signal based on the difference, thereby producing an effect that it is possible to more accurately suppress a color shift in display of a light guide element portion which color shift is caused by environment illuminance.

In order to attain the object, the display device of the present invention is arranged such that the at least one display panel comprises a plurality of display panels including a first display panel and a second display panel which is provided in proximity with or in contact with the first display panel, and a light guide element provided on the first display panel is in contact with a light guide element provided on the second display panel with no gap therebetween.

The arrangement produces an effect that a display constituted by a plurality of display panels which have frames and are connected to each other can be perceived without a sense of strangeness as if the display is a continuous display having no frame.

In order to attain the object, the display device of the present invention is arranged such that the at least one display panel includes liquid crystal elements as the plurality of display elements.

According to the arrangement, it is possible to provide a display device including liquid crystal display panels, which have small thickness, light weight, and excellent power-saving capability. Consequently, it is possible to produce an effect that a display in which a plurality of liquid crystal display panels each having a frame are connected to each other can be perceived without a sense of strangeness as if the display is a continuous display having no frame.

A combination of a feature in a focused claim and a feature in another claim is not limited to a combination of the feature in the focused claim and a feature in a claim cited in the focused claim. The feature in the focused claim can be combined with a feature in a claim that is not cited in the focused claim, as long as the object of the present invention can be attained.

INDUSTRIAL APPLICABILITY

The present invention is applicable to various direct-view-type display devices.

REFERENCE SIGNS LIST

1: Display device
2: Liquid crystal display panel
3: Backlight device
4: Light guide element
5: Transparent cover
6a, 6b: Light path
7: Display control circuit (image signal correcting section)
8: Video signal line driving circuit (driving section)
9: Scanning signal line driving circuit
10: Backlight driving circuit
11: Common electrode driving circuit
12: Data correcting section
13: Timing control section
14: Corrected area address storage section (corrected position storage section)
15: RAM control section
16: Corrected area control section
17: Illuminance judging section
100: Photosensor (color sensor)
101: RAM for blue
102: RAM for green
103: RAM for red
110a, 110b: Polarization plate
111: TFT substrate
112: Liquid crystal layer
113: CF substrate
115: Lens sheet etc.
116: Light guide plate
117: Reflecting sheet
203: LED
A1: Normal display area
A2: Display area end portion
A3: Frame area
GL(k): Scanning signal line (k=1, 2, 3 . . . )
SL(j): Video signal line (j=1, 2, 3 . . . )
DAT (r, g, b): Image signal (red, green, blue)
DV (r, g, b): Corrected image signal (red, green, blue)
AD: Corrected area address
CT, CS, SS, BS: Control signal
LK: Illuminance signal
LS: Illuminance judgment signal

The invention claimed is:

1. A display device that displays an image based on image signals, comprising:
   at least one display panel on which a plurality of display elements for displaying the image are disposed in a matrix, the at least one display panel having a frame area which is located at an end of the at least one display panel and in which no display element is provided;
   a light guide element provided on the at least one display panel, the light guide element changing a light path of part of light emitted from the plurality of display elements so that the part of light is guided to the frame area;
   at least one photosensor provided on the at least one display panel, the at least one photosensor detecting environment illuminance;
   an image signal correcting section which (i) corrects, in accordance with the environment illuminance detected by the at least one photosensor, an image signal to be supplied to a display element included in an area where the light guide element is provided out of the image signals, and (ii) outputs a result obtained by the correction as a corrected image signal; and a driving section which drives the display element in accordance with the corrected image signal.

2. The display device according to claim 1, wherein:

the at least one display panel includes plural kinds of display elements emitting different colors, and the image signal correcting section corrects an image signal to be supplied to at least one kind of display element.

3. The display device according to claim 1, wherein:

the correction carried out by the image signal correcting section includes correction of reducing coloring of display light of the image caused by external light entering the light guide element.

4. The display device according to claim 1, wherein:

the correction carried out by the image signal correcting section includes correcting at least one of (i) an image signal to be supplied to a display element in the area where the light guide element is provided and (ii) an image signal to be supplied to a display element in the area where the light guide element is not provided so that at least one of attenuation and coloring of light that occur in a case where light from the display element passes through the light guide element is compensated.

5. The display device according to claim 1, wherein:

the image signal correcting section includes:

an illuminance judging section which receives an illuminance signal supplied from the at least one photosensor, judges an environment illuminance based on the illuminance signal, and outputs an illuminance judgment signal in accordance with a result of the judgment of the environment illuminance; and a data correcting section which corrects the image signal in accordance with the illuminance judgment signal.

6. The display device according to claim 5, wherein:

the image signal correcting section further includes a corrected position storage section which stores positional information specifying a position of a display element subjected to image signal correction out of the plurality of display elements disposed in a matrix.

7. The display device according to claim 5, wherein:

the illuminance judging section (i) judges the environment illuminance in a case where positional information of a display element to which an image signal is to be supplied matches positional information specifying a position of the display element included in the area where the light guide element is provided, and (ii) outputs the illuminance judgment signal in accordance with a result of the judgment of the environment illuminance.

8. The display device according to claim 1, wherein the at least one photosensor is provided in proximity with the light guide element.

9. The display device according to claim 1, wherein the at least one photosensor is capable of detecting at least a wavelength range absorbed by the light guide element.

10. The display device according to claim 1, wherein:

the at least one photosensor is a color sensor which has different sensitivities for respective colors and which is capable of detecting light amounts of the colors at a same time, and the at least one photosensor includes a photosensor which receives light that has passed through the light guide element and a photosensor which receives light that does not pass through the light guide element.

11. The display device according to claim 1, wherein:

the at least one display panel comprises a plurality of display panels including a first display panel and a second display panel which is provided in proximity with or in contact with the first display panel, and a light guide element provided on the first display panel is in contact with a light guide element provided on the second display panel with no gap therebetween.

12. The display device according to claim 1, wherein the at least one display panel includes liquid crystal elements as the plurality of display elements.

13. The display device according to claim 1, wherein the image signal correcting section corrects the image signal in accordance with the environment illuminance so that at least one of a reduction in luminance and a color shift that occur due to the light guide element is reduced.

14. A method for driving a display device including a display panel on which a plurality of display elements for displaying an image based on image signals are disposed in a matrix, the display panel having a frame area which is located at an end of the display panel and in which no display element is provided, the method comprising the steps of:

detecting an environment illuminance of the display device;

correcting, in accordance with the environment illuminance thus detected, an image signal to be supplied to a display element included in an area where a light guide element is provided out of the image signals, the light guide element being provided on the display panel, and the light guide element changing a light path of light emitted from the plurality of display elements so that the light is guided to the frame area; and driving the display element in accordance with a corrected image signal obtained by the correction.

15. The method according to claim 14, wherein in the step of correcting in accordance with the environment illuminance thus detected, the image signal is corrected in accordance with the environment illuminance so that at least one of a reduction in luminance and a color shift that occur due to the light guide element is reduced.

* * * * *